US011996797B2

(12) United States Patent
Wray et al.

(10) Patent No.: US 11,996,797 B2
(45) Date of Patent: May 28, 2024

(54) STEP FLAPS FOR PHOTOVOLTAIC AND ROOFING SHINGLES

(71) Applicant: GAF Energy LLC, Parsippany, NJ (US)

(72) Inventors: Evan Michael Wray, Cotati, CA (US); Michael David Kuiper, Newark, CA (US); Thierry Nguyen, San Francisco, CA (US); Peter Clemente, Parsippany, NJ (US); Toby Tonascia, Arroyo Grande, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 17/540,773

(22) Filed: Dec. 2, 2021

(65) Prior Publication Data

US 2022/0173694 A1 Jun. 2, 2022

Related U.S. Application Data

(60) Provisional application No. 63/120,577, filed on Dec. 2, 2020.

(51) Int. Cl.
*H02S 20/25* (2014.01)
*E04D 1/20* (2006.01)

(52) U.S. Cl.
CPC ............. *H02S 20/25* (2014.12); *E04D 1/20* (2013.01)

(58) Field of Classification Search
CPC .................................. H02S 20/25; E04D 1/20
See application file for complete search history.

(56) References Cited

U.S. PATENT DOCUMENTS

| | | | |
|---|---|---|---|
| 1,981,467 A | 11/1934 | Radtke | |
| 3,156,497 A | 11/1964 | Lessard | |
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 5,167,579 A | 12/1992 | Rotter | |
| 5,437,735 A | 8/1995 | Younan et al. | |

(Continued)

FOREIGN PATENT DOCUMENTS

| | | |
|---|---|---|
| CA | 2829440 A1 | 4/2014 |
| CH | 700095 A2 | 6/2010 |

(Continued)

OTHER PUBLICATIONS

Sunflare, Procducts: "Sunflare Develops Prototype for New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Nathan L Van Sell
(74) *Attorney, Agent, or Firm* — GREENBERG TRAURIG, LLP

(57) ABSTRACT

A system including a plurality of photovoltaic shingles installed on a roof deck, a plurality of roofing shingles, such as asphalt shingles, installed on the roof deck, and a plurality of step flaps. One end of the roofing shingle overlays a first side of a corresponding one of the step flaps, and one end of photovoltaic shingle overlays a second side of the corresponding one of the step flaps.

14 Claims, 14 Drawing Sheets

(56) References Cited

U.S. PATENT DOCUMENTS

| | | |
|---|---|---|
| 5,590,495 A | 1/1997 | Bressler et al. |
| 5,642,596 A | 7/1997 | Waddington |
| 6,008,450 A | 12/1999 | Ohtsuka et al. |
| 6,046,399 A | 4/2000 | Kapner |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,666,491 B2 | 2/2010 | Yang et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Browder |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,623,499 B2 | 1/2014 | Viasnoff |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,145,498 B2 | 9/2015 | Ultsch |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,171,991 B2 | 10/2015 | Pearce |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rodrigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,528,270 B2 | 12/2016 | Jenkins et al. |
| 9,605,432 B1 | 3/2017 | Robbins |
| 9,670,353 B2 | 6/2017 | Peng et al. |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,920,515 B2 | 3/2018 | Xing et al. |
| 9,923,515 B2 | 3/2018 | Rodrigues et al. |
| 9,938,729 B2 | 4/2018 | Coon |
| 9,987,786 B2 | 6/2018 | Stoiljkovic et al. |
| 9,991,412 B2 | 6/2018 | Gonzalez et al. |
| 9,998,067 B2 | 6/2018 | Kalkanoglu et al. |
| 10,015,933 B2 | 7/2018 | Boldrin |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,179,852 B2 | 1/2019 | Gossi et al. |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,480,192 B2 | 11/2019 | Xing et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,669,414 B2 | 6/2020 | Li et al. |
| 10,784,813 B2 | 9/2020 | Kalkanoglu et al. |
| D904,289 S | 12/2020 | Lance et al. |
| 10,907,355 B2 | 2/2021 | Hubbard et al. |
| 10,914,063 B2 | 2/2021 | Lee et al. |
| RE48,555 E | 5/2021 | Cancio et al. |
| 11,012,026 B2 | 5/2021 | Kalkanoglu et al. |
| 11,015,085 B2 | 5/2021 | Bruns et al. |
| 11,065,849 B2 | 7/2021 | Ackermann et al. |
| 11,177,639 B1 | 11/2021 | Nguyen et al. |
| 11,217,715 B2 | 1/2022 | Sharenko et al. |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 2002/0053360 A1 | 5/2002 | Kinoshita et al. |
| 2002/0102422 A1 | 8/2002 | Hubbard et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2006/0042683 A1 | 3/2006 | Gangemi |
| 2006/0046084 A1 | 3/2006 | Yang et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placer et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |

(56) References Cited

U.S. PATENT DOCUMENTS

| | | |
|---|---|---|
| 2009/0000222 A1 | 1/2009 | Kalkanoglu et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu |
| 2009/0178350 A1 | 7/2009 | Kalkanoglu et al. |
| 2009/0220720 A1* | 9/2009 | Mohseen ............... E04D 1/29 156/60 |
| 2009/0229652 A1 | 9/2009 | Mapel et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1 | 7/2010 | Railkar et al. |
| 2010/0242381 A1 | 9/2010 | Jenkins |
| 2010/0313499 A1 | 12/2010 | Gangemi |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2012/0017972 A1* | 1/2012 | Jenkins ............... E04D 1/26 136/252 |
| 2012/0034799 A1 | 2/2012 | Hunt |
| 2012/0060902 A1 | 3/2012 | Drake |
| 2012/0137600 A1 | 3/2012 | Drake |
| 2012/0176077 A1 | 7/2012 | Oh et al. |
| 2012/0212065 A1 | 8/2012 | Cheng et al. |
| 2012/0233940 A1 | 9/2012 | Perkins |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0033625 A1* | 2/2014 | Jenkins ............... H02S 20/23 52/173.3 |
| 2014/0090697 A1 | 4/2014 | Rodrigues et al. |
| 2014/0150843 A1 | 6/2014 | Pearce et al. |
| 2014/0157694 A1* | 6/2014 | Jenkins ............... H02S 20/00 52/173.3 |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0024159 A1 | 1/2015 | Bess et al. |
| 2015/0089895 A1 | 4/2015 | Leitch |
| 2015/0340516 A1 | 11/2015 | Kim et al. |
| 2015/0349173 A1 | 12/2015 | Morad et al. |
| 2016/0105144 A1 | 4/2016 | Haynes et al. |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0203555 A1 | 7/2017 | Wang et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0094439 A1 | 4/2018 | Wang et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0281347 A1 | 10/2018 | Gossi |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0305717 A1 | 10/2019 | Allen et al. |
| 2019/0379322 A1* | 12/2019 | Britt ............... H01L 31/049 |
| 2020/0020819 A1 | 1/2020 | Farhangi |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0002898 A1 | 1/2021 | Knebel et al. |
| 2021/0095474 A1 | 4/2021 | Yang et al. |
| 2021/0113970 A1 | 4/2021 | Stainer et al. |
| 2021/0115223 A1 | 4/2021 | Bonekamp et al. |
| 2021/0159353 A1 | 5/2021 | Li et al. |
| 2021/0171808 A1 | 6/2021 | Ackermann et al. |
| 2021/0172174 A1 | 6/2021 | Ackermann et al. |
| 2022/0149213 A1 | 5/2022 | Mensink et al. |

FOREIGN PATENT DOCUMENTS

| | | |
|---|---|---|
| CN | 202797032 U | 3/2013 |
| DE | 1958248 A1 | 11/1971 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| JP | 10046767 A | 2/1998 |
| JP | 2002-106151 A | 4/2002 |
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-2019-0000367 A1 | 1/2019 |
| KR | 10-2253483 B1 | 5/2021 |
| NL | 2026856 B1 | 6/2022 |
| WO | 2011/049944 A1 | 4/2011 |
| WO | 2015/133632 A1 | 9/2015 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.

Tesla, Solar Roof <<tesla.com/solarroof>> retrieved Feb. 2, 2021.

"Types of Roofing Underlayment", Owens Corning Roofing; <<https://www.owenscorning.com/en-us/roofing/tools/how-roofing-underlayment-helps-protect-your-home>> retrieved Nov. 1, 2021.

* cited by examiner

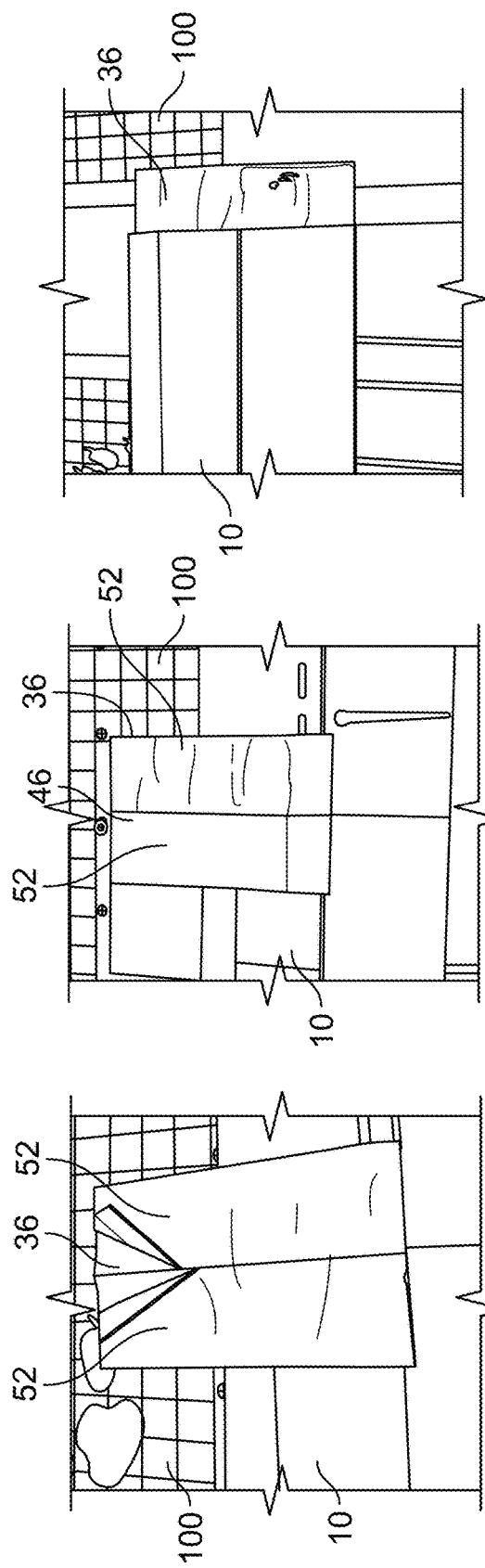
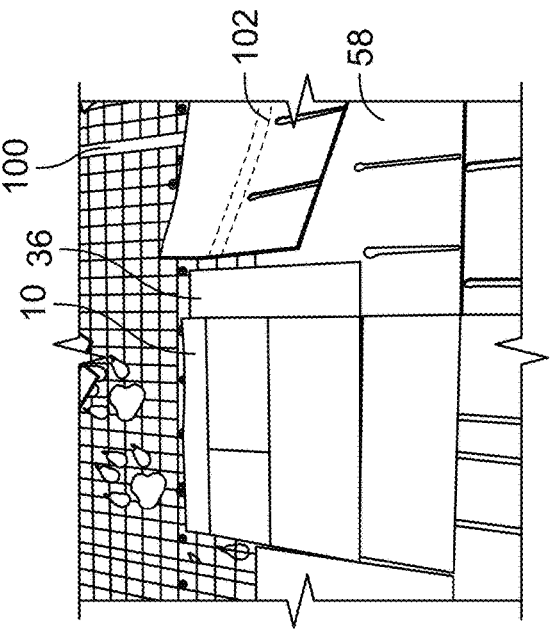
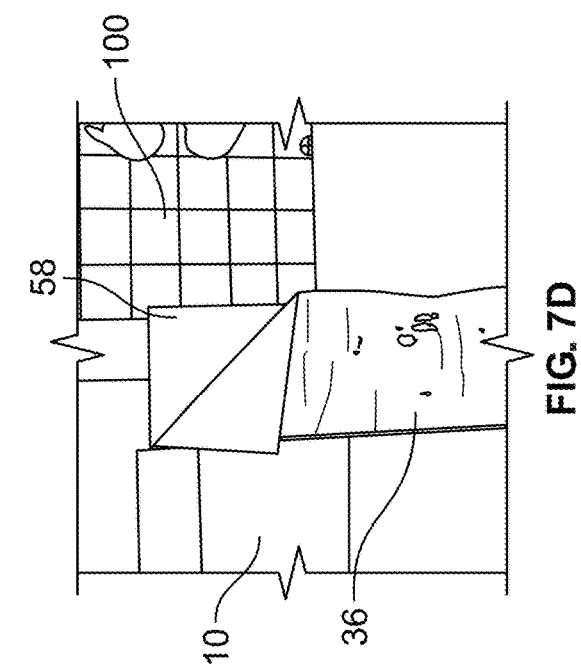

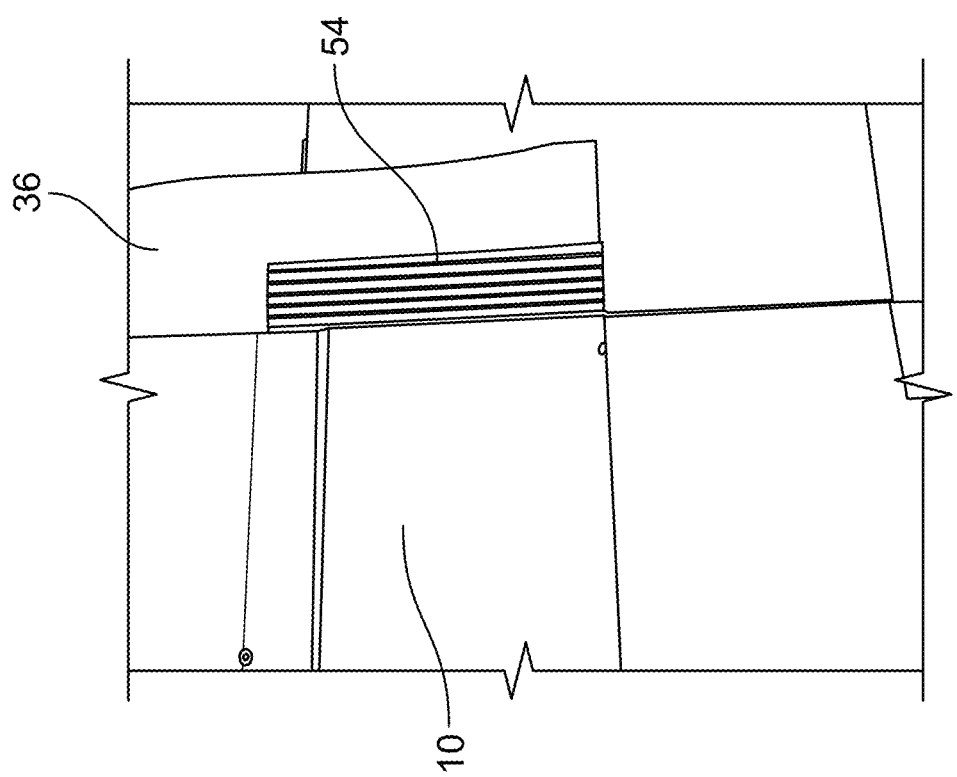
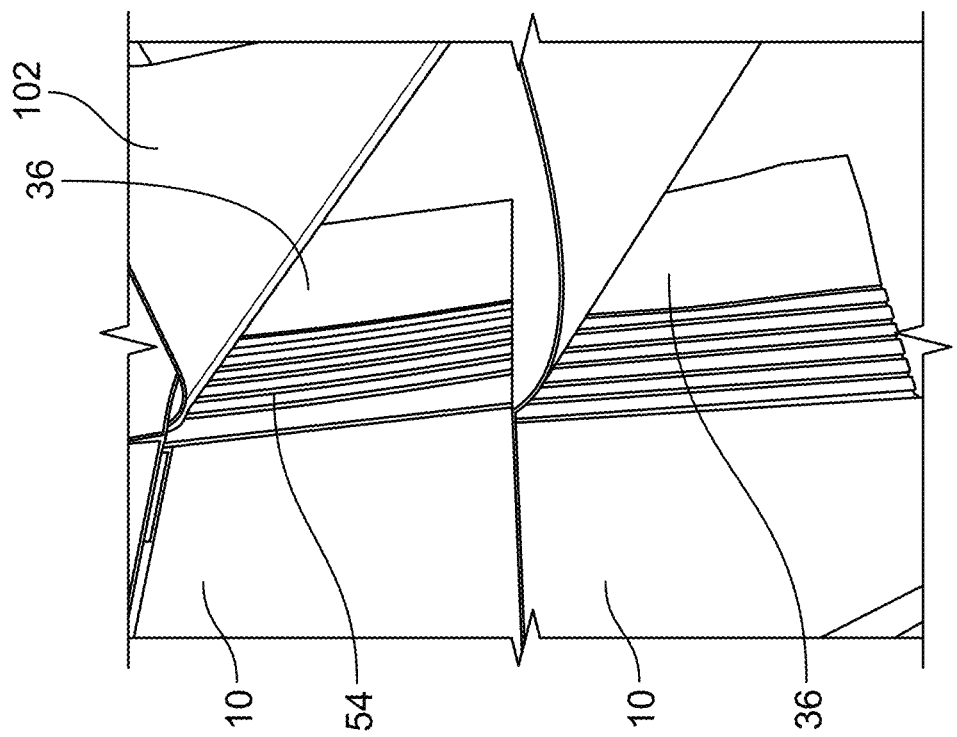

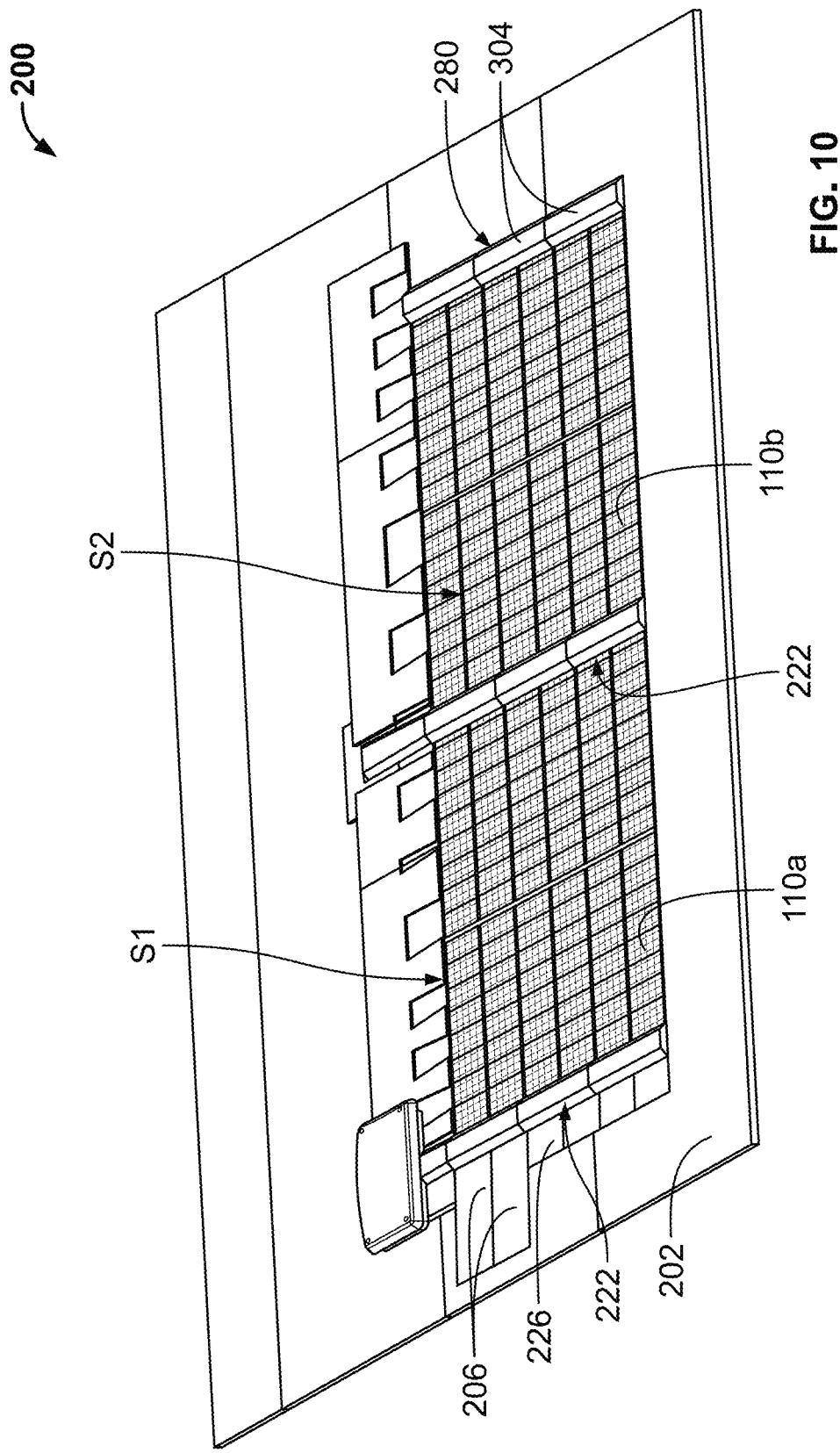

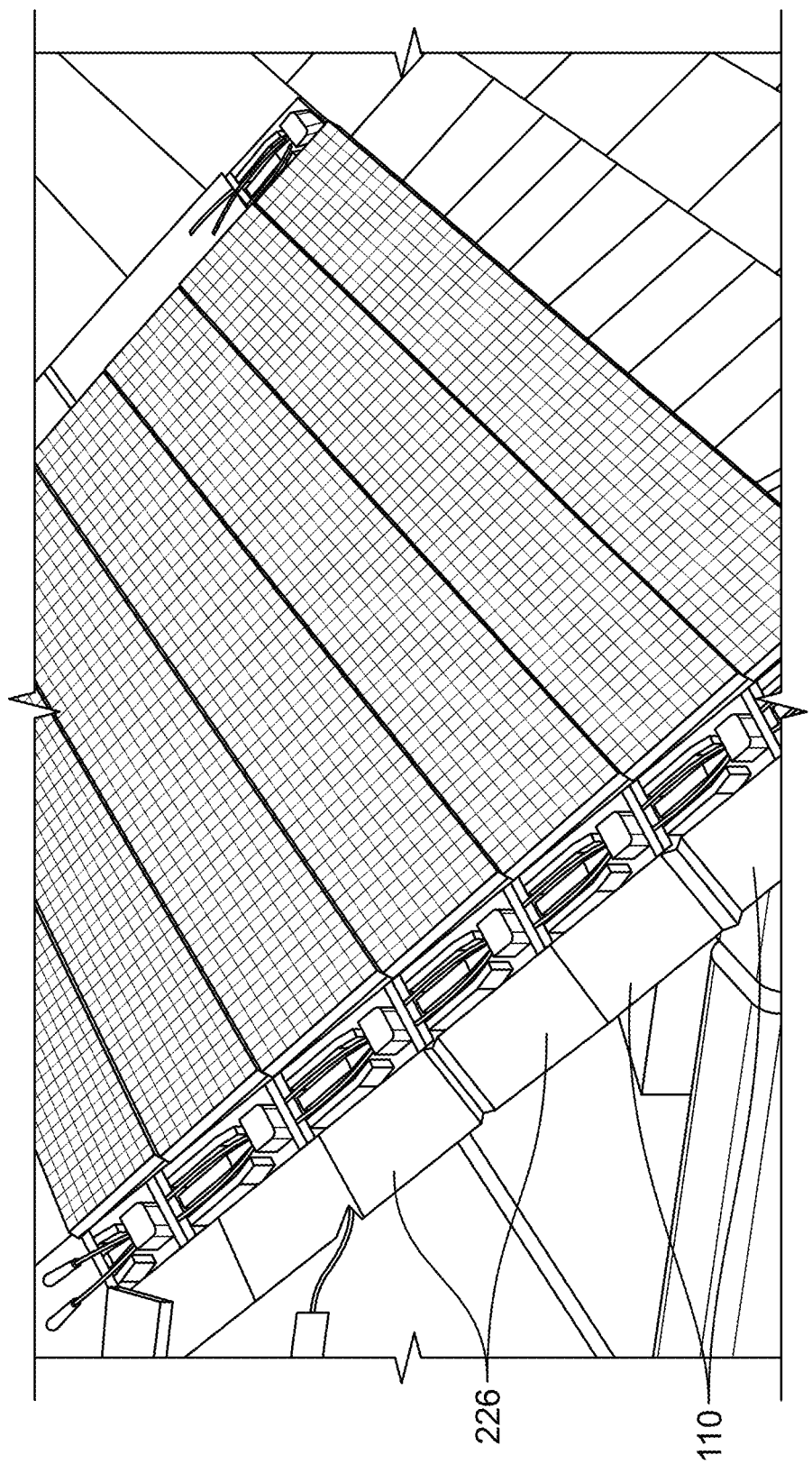

STEP FLAPS FOR PHOTOVOLTAIC AND ROOFING SHINGLES

CROSS-REFERENCE TO RELATED APPLICATION

This application is a Section 111(a) application relating to and claiming the benefit of commonly-owned, co-pending U.S. Provisional Patent Application Ser. No. 63/120,577, filed Dec. 2, 2020, entitled "STEP FLAPS FOR PHOTOVOLTAIC SHINGLES," the contents of which are incorporated herein by reference in its entirety.

FIELD OF THE INVENTION

The present invention relates to roofing shingles and, more particularly, step flaps for roofing shingles and photovoltaic shingles.

BACKGROUND OF THE INVENTION

Photovoltaic systems having solar panels are commonly installed on roofing of structures. What is needed is a photovoltaic system having features for efficient installation thereof and water shedding.

SUMMARY OF THE INVENTION

In some embodiments, a system includes a roof deck; at least first and second roofing shingles installed on the roof deck, wherein each of the at least first and second roofing shingles includes a first end, a second end opposite the first end, a first edge extending from the first end to the second end, and a second edge opposite the first edge and extending from the first end to the second end; and at least one step flap having a first side, a second side opposite the first side, a first edge extending from the first side to the second side, and a second edge opposite the first edge of the at least one step flap and extending from the first side to the second side, wherein the second end of the first roofing shingle overlays the first side of the at least one step flap, and wherein the first end of the second roofing shingle overlays the second side of the at least one step flap.

In some embodiments, the first roofing shingle is an asphalt shingle. In some embodiments, the first roofing shingle is a photovoltaic shingle. In some embodiments, the second roofing shingle is a photovoltaic shingle. In some embodiments, the first edge of the at least one step flap is vertically offset from the first edge of the second roofing shingle by 1 inch to 5 inches. In some embodiments, the at least one step flap is composed of a polymer. In some embodiments, the at least one step flap includes thermoplastic polyolefin (TPO). In some embodiments, the at least one step flap has a thickness of 0.1 mm to 5 mm.

In some embodiments, the at least one step flap includes a first timing mark extending from the first edge to the second edge and between the first side and the second side, wherein the first timing mark extends substantially midway between the first edge and the second edge, and wherein the at least one step flap includes a second timing mark extending from the first side to the second side and between the first edge and the second edge, and wherein the second timing mark extends substantially midway between the first side and the second side. In some embodiments, the at least one step flap includes a surface and an adhesive on the surface. In some embodiments, the surface includes at least one release line that extends from the first edge of the at least one step flap to the second edge of the at least one step flap and between the first side and the second side. In some embodiments, the system further includes a film removably attached to the surface.

In some embodiments, a system includes a roof deck; at least one photovoltaic shingle installed on the roof deck, wherein the at least one photovoltaic shingle includes a first end, a second end opposite the first end, a first edge extending from the first end to the second end, and a second edge opposite the first edge and extending from the first end to the second end; at least one step flap, wherein the at least one step flap includes a first side, a second side opposite the first side, a first edge extending from the first side to the second side, and a second edge opposite the first edge of the at least one step flap and extending from the first side to the second side; and at least one roofing shingle, wherein the at least one roofing shingle includes a first end and a second end opposite the first end of the at least one roofing shingle, wherein the second end of the at least one roofing shingle overlays the first side of a corresponding one of the at least one step flap, and wherein the first end of the at least one photovoltaic shingle overlays the second side of the corresponding one of the at least one step flap.

In some embodiments, the at least one photovoltaic shingle includes a plurality of photovoltaic shingles, wherein the at least one step flap includes a plurality of step flaps, wherein the at least one roofing shingle includes a plurality of roofing shingles, wherein the second end of each of the roofing shingles overlays the first side of a corresponding one of the plurality of step flaps, and wherein the first end of each of the plurality of photovoltaic shingles overlays the second side of the corresponding one of the plurality of step flaps. In some embodiments, the plurality of photovoltaic shingles is arranged in a plurality of rows, wherein the first ends of the plurality of photovoltaic shingles is substantially aligned with one another, wherein the second ends of the plurality of roofing shingles is substantially aligned with one another, and wherein the second end of each of the plurality of roofing shingles is adjacent to the first end of a corresponding one of the photovoltaic shingles.

In some embodiments, a method includes the steps of obtaining at least first and second roofing shingles, wherein each of the first and second roofing shingles includes a first end, a second end opposite the first end, a first edge extending from the first end to the second end, and a second edge opposite the first edge and extending from the first end to the second end; obtaining at least one step flap, wherein each of the at least one step flap includes a first side, a second side opposite the first side, a first edge extending from the first side to the second side, and a second edge opposite the first edge of the at least one step flap and extending from the first side to the second side; installing the at least one step flap on a roof deck; overlaying the first end of the second roofing shingle over the second side of the at least one step flap; and overlaying the second end of the first roofing shingle over the first side of the at least one step flap.

In some embodiments, the first roofing shingle is an asphalt shingle. In some embodiments, the second roofing shingle is a photovoltaic shingle. In some embodiments, the first edge of the at least one step flap is vertically offset from the first edge of the second roofing shingle by 1 inch to 5 inches. In some embodiments, the at least one step flap includes thermoplastic polyolefin (TPO).

BRIEF DESCRIPTION OF THE DRAWINGS

FIGS. 7A through 7E show a method of installing a roofing system including the photovoltaic shingle having a step flap shown in FIGS. 2A through 2C;

FIGS. 8A and 8B show an installation of a photovoltaic shingle including the step flap shown in FIG. 5;

FIG. 10 is a top perspective view of the photovoltaic system shown in FIG. 9;

FIG. 11 is an illustration of embodiments of a photovoltaic system incorporating a plurality of step flaps;

DETAILED DESCRIPTION

Figure 1:
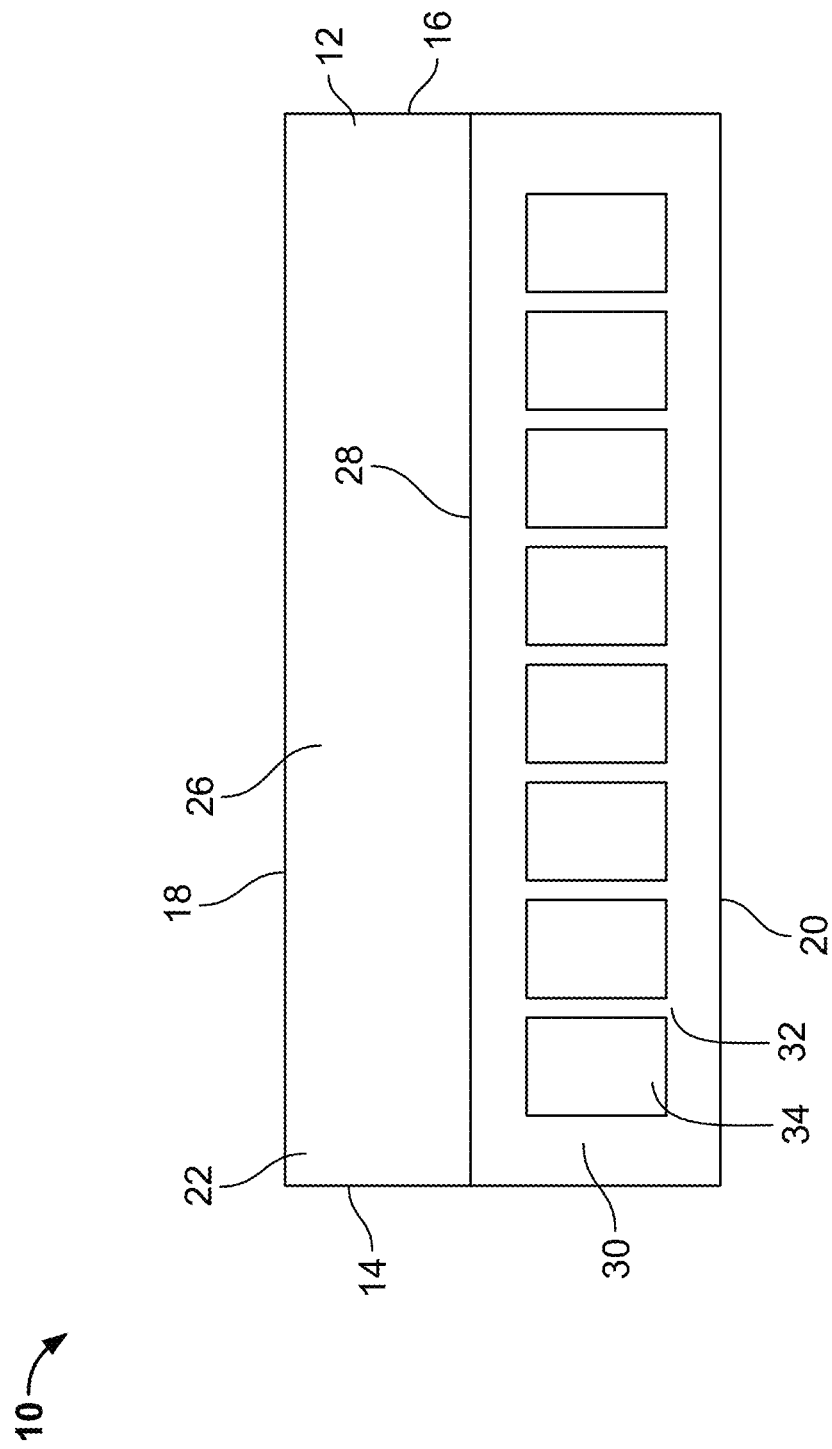
FIG. 1 is a top plan view of an embodiment of a photovoltaic shingle.

Referring to FIG. 1, in some embodiments, a photovoltaic shingle 10 includes a first layer 12 having a first end 14, a second end 16 opposite the first end 14, a first edge 18 extending from the first end 14 to the second end 16, and a second edge 20 opposite the first edge 18 and extending from the first end 14 to the second end 16. In some embodiments, the first layer includes a surface 22.

In some embodiments, the first layer 12 is made from a polymer. In some embodiments, the first layer 12 includes thermoplastic polyolefin (TPO). In other embodiments, the first layer includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers—ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the first layer 12 has a thickness of 0.1 mm to 5 mm. In some embodiments, the first layer 12 has a thickness of 0.1 mm to 4.5 mm. In some embodiments, the first layer 12 has a thickness of 0.1 mm to 4 mm. In some embodiments, the first layer 12 has a thickness of 0.1 mm to 3.5 mm. In some embodiments, the first layer 12 has a thickness of 0.1 mm to 3 mm. In some embodiments, the first layer 12 has a thickness of 0.1 mm to 2.5 mm. In some embodiments, the first layer 12 has a thickness of 0.1 mm to 2 mm. In some embodiments, the first layer 12 has a thickness of 0.1 mm to 1.5 mm. In some embodiments, the first layer 12 has a thickness of 0.1 mm to 1 mm. In some embodiments, the first layer 12 has a thickness of 0.1 mm to 0.5 mm.

In some embodiments, the first layer 12 has a thickness of 0.5 mm to 5 mm. In some embodiments, the first layer 12 has a thickness of 0.5 mm to 4.5 mm. In some embodiments, the first layer 12 has a thickness of 0.5 mm to 4 mm. In some embodiments, the first layer 12 has a thickness of 0.5 mm to 3.5 mm. In some embodiments, the first layer 12 has a thickness of 0.5 mm to 3 mm. In some embodiments, the first layer 12 has a thickness of 0.5 mm to 2.5 mm. In some embodiments, the first layer 12 has a thickness of 0.5 mm to 2 mm. In some embodiments, the first layer 12 has a thickness of 0.5 mm to 1.5 mm. In some embodiments, the first layer 12 has a thickness of 0.5 mm to 1 mm.

In some embodiments, the first layer 12 has a thickness of 1 mm to 5 mm. In some embodiments, the first layer 12 has a thickness of 1 mm to 4.5 mm. In some embodiments, the first layer 12 has a thickness of 1 mm to 4 mm. In some embodiments, the first layer 12 has a thickness of 1 mm to 3.5 mm. In some embodiments, the first layer 12 has a thickness of 1 mm to 3 mm. In some embodiments, the first layer 12 has a thickness of 1 mm to 2.5 mm. In some embodiments, the first layer 12 has a thickness of 1 mm to 2 mm. In some embodiments, the first layer 12 has a thickness of 1 mm to 1.5 mm.

In some embodiments, the first layer 12 has a thickness of 1.5 mm to 5 mm. In some embodiments, the first layer 12 has a thickness of 1.5 mm to 4.5 mm. In some embodiments, the first layer 12 has a thickness of 1.5 mm to 4 mm. In some embodiments, the first layer 12 has a thickness of 1.5 mm to 3.5 mm. In some embodiments, the first layer 12 has a thickness of 1.5 mm to 3 mm. In some embodiments, the first layer 12 has a thickness of 1.5 mm to 2.5 mm. In some embodiments, the first layer 12 has a thickness of 1.5 mm to 2 mm.

In some embodiments, the first layer 12 has a thickness of 2 mm to 5 mm. In some embodiments, the first layer 12 has a thickness of 2 mm to 4.5 mm. In some embodiments, the first layer 12 has a thickness of 2 mm to 4 mm. In some embodiments, the first layer 12 has a thickness of 2 mm to 3.5 mm. In some embodiments, the first layer 12 has a thickness of 2 mm to 3 mm. In some embodiments, the first layer 12 has a thickness of 2 mm to 2.5 mm.

In some embodiments, the first layer 12 has a thickness of 2.5 mm to 5 mm. In some embodiments, the first layer 12 has a thickness of 2.5 mm to 4.5 mm. In some embodiments, the first layer 12 has a thickness of 2.5 mm to 4 mm. In some embodiments, the first layer 12 has a thickness of 2.5 mm to 3.5 mm. In some embodiments, the first layer 12 has a thickness of 2.5 mm to 3 mm.

In some embodiments, the first layer 12 has a thickness of 3 mm to 5 mm. In some embodiments, the first layer 12 has a thickness of 3 mm to 4.5 mm. In some embodiments, the first layer 12 has a thickness of 3 mm to 4 mm. In some embodiments, the first layer 12 has a thickness of 3 mm to 3.5 mm. In some embodiments, the first layer 12 has a thickness of 3.5 mm to 5 mm. In some embodiments, the first layer 12 has a thickness of 3.5 mm to 4.5 mm. In some embodiments, the first layer 12 has a thickness of 3.5 mm to 4 mm. In some embodiments, the first layer 12 has a thickness of 4 mm to 5 mm. In some embodiments, the first layer 12 has a thickness of 4 mm to 4.5 mm. In some embodiments, the first layer 12 has a thickness of 4.5 mm to 5 mm.

In some embodiments, the first layer 12 has a thickness of 0.1 mm. In some embodiments, the first layer 12 has a thickness of 0.5 mm. In some embodiments, the first layer 12 has a thickness of 1 mm. In some embodiments, the first layer 12 has a thickness of 1.5 mm. In some embodiments, the first layer 12 has a thickness of 2 mm. In some embodiments, the first layer 12 has a thickness of 2.5 mm. In some embodiments, the first layer 12 has a thickness of 3 mm. In some embodiments, the first layer 12 has a thickness of 3.5 mm. In some embodiments, the first layer 12 has a thickness of 4 mm. In some embodiments, the first layer 12 has a thickness of 4.5 mm. In some embodiments, the first layer 12 has a thickness of 5 mm.

Still referring to FIG. 1, in some embodiments, the photovoltaic shingle 10 includes a head lap 26 that extends from the first end 14 to the second end 16. In some embodiments, the head lap 26 extends from the first edge 18 to a first location 28 between the first edge 18 and the second edge 20. In some embodiments, the photovoltaic shingle 10 includes a reveal portion 30 extending from the first end 14 to the second end 16. In some embodiments, the reveal portion 30 extends from the second edge 20 to the first location 28. In some embodiments, the reveal portion 30 is located adjacent to the head lap 26.

Still referring to FIG. 1, in some embodiments, the reveal portion 30 includes a second layer 32 overlaying the first layer 12. In some embodiments, the second layer 32 includes at least one solar cell 34. In some embodiments, the at least one solar cell 34 includes a plurality of solar cells.

In some embodiments, the second layer 32 is made from a polymer. In some embodiments, the second layer 32 includes thermoplastic polyolefin (TPO). In other embodiments, the second layer 32 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers—ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the first layer 12 and the second layer 32 are laminated. In some embodiments, the second layer 32 is ultrasonically welded to the first layer 12. In some embodiments, the second layer 32 is heat welded to the first layer 12. In some embodiments, the second layer 32 is thermally bonded to the first layer 12.

Figure 2A:
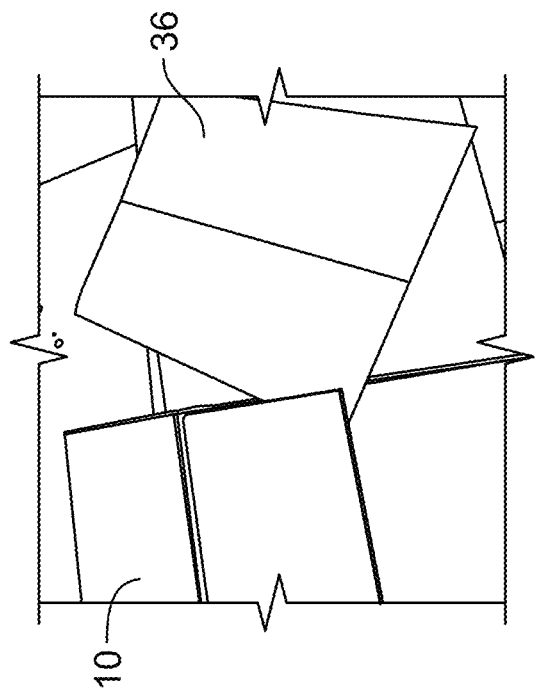
FIGS. 2A through 2C are illustrations of an embodiment of a photovoltaic shingle with a step flap attached thereto.
Figure 2C:
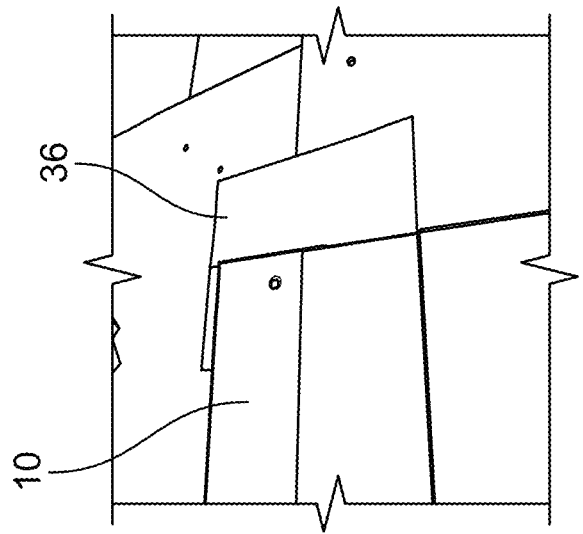
Figure 2B:
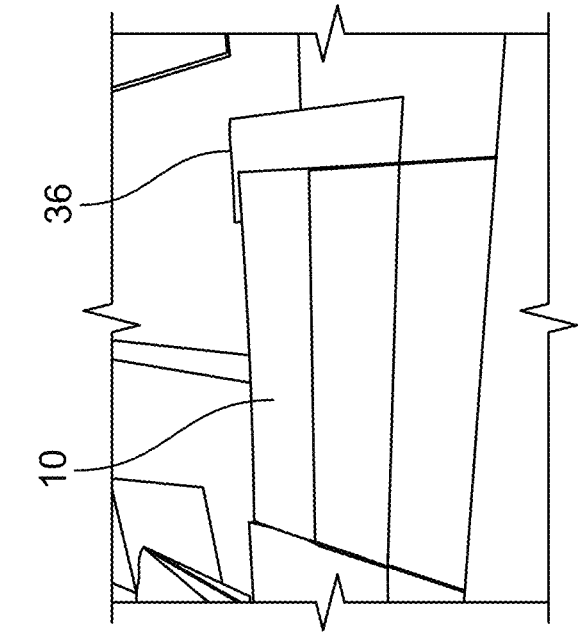

Referring to FIGS. 2A through 2C, in some embodiments, a step flap 36 includes a first side 38, a second side 40 opposite the first side 38, a first edge 42 extending from the first side 38 to the second side 40, and a second edge 44 opposite the first edge 42 and extending from the first side 38 to the second side 40. In some embodiments, the step flap 36 includes a surface 46. In some embodiments, the step flap 36 is configured to be installed on a roof deck. In some embodiments, the step flap 36 is configured to be installed on the roof deck by an adhesive. In some embodiments, the step flap 36 is configured to be installed on the roof deck by fasteners.

In some embodiments, and as to be described in further detail below, the step flap 36 is a layer of material configured to enable a straight edge installations of the photovoltaic shingle 10 and roofing shingles (e.g., asphalt shingles) adjacent thereto on the roof deck and/or a first one of the photovoltaic shingle 10 and a second one of the photovoltaic shingle 10 adjacent thereto. In some embodiments, the step flap 36 is configured to provide watershedding at a butt joint between at least two shingles. In some embodiments, the step flap 36 is configured to provide watershedding at a butt joint between a photovoltaic shingle 10 and a roofing shingle. In some embodiments, the roofing shingle is an asphalt shingle. In some embodiments, the step flap 36 is configured to provide watershedding at a butt joint between a first photovoltaic shingle 10 and a second photovoltaic shingle 10. In some embodiments, the step flap 36 is configured to shed water out on top of the reveal portion 30 of a shingle or shingles below the step flap 36 when installed on a slope of the roof deck. In some embodiments, the step flap 36 is a component separate from the photovoltaic shingle 10 and the roofing shingle when the step flap 36 is uninstalled.

In some embodiments, the step flap 36 has an area that is smaller than an area of the photovoltaic shingle 10. In some embodiments, the step flap 36 has an area that is substantially smaller than an area of the photovoltaic shingle 10. In some embodiments, the step flap 36 has a size and shape that are different from those of the photovoltaic shingle 10.

In some embodiments, the step flap 36 has an area that is smaller than an area of the roofing shingle. In some embodiments, the step flap 36 has an area that is substantially smaller than an area of the roofing shingle. In some embodiments, the step flap 36 has a size and shape that are different from those of the roofing shingle.

Figure 3:
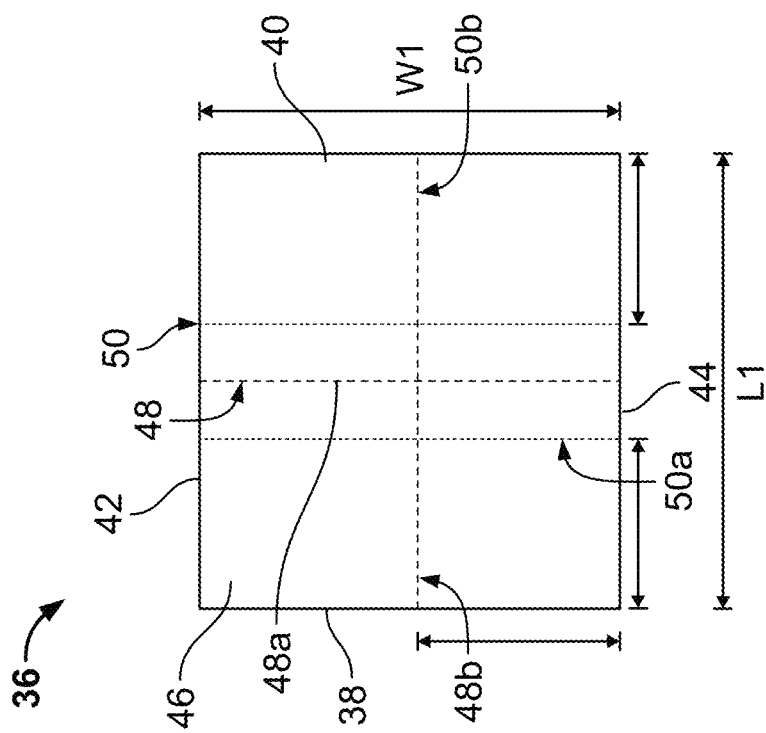

Referring to FIG. 3, in some embodiments, the step flap 36 has a square shape. In some embodiments, the step flap 36 has a rectangular shape. In some embodiments, the step flap 36 has a polygonal shape. In some embodiments, the step flap 36 has a triangular shape. In some embodiments, the step flap 36 has a circle shape. In some embodiments, the step flap 36 has an oval or elliptical shape. In other embodiments, the step flap 36 includes other suitable shapes and sizes. In some embodiments, each of the first edge 42 and the second edge 44 includes a first length L1. In some embodiments, the first length L1 is 4 inches to 40 inches. In some embodiments, the first length L1 is 4 inches to 35 inches. In some embodiments, the first length L1 is 4 inches to 30 inches. In some embodiments, the first length L1 is 4 inches to 25 inches. In some embodiments, the first length L1 is 4 inches to 20 inches. In some embodiments, the first length L1 is 4 inches to 15 inches. In some embodiments, the first length L1 is 4 inches to 10 inches. In some embodiments, the first length L1 is 4 inches to 5 inches.

In some embodiments, the first length L1 is 5 inches to 40 inches. In some embodiments, the first length L1 is 5 inches to 35 inches. In some embodiments, the first length L1 is 5 inches to 30 inches. In some embodiments, the first length L1 is 5 inches to 25 inches. In some embodiments, the first length L1 is 5 inches to 20 inches. In some embodiments, the first length L1 is 5 inches to 15 inches. In some embodiments, the first length L1 is 5 inches to 10 inches.

In some embodiments, the first length L1 is 10 inches to 40 inches. In some embodiments, the first length L1 is 10 inches to 35 inches. In some embodiments, the first length L1 is 10 inches to 30 inches. In some embodiments, the first length L1 is 10 inches to 25 inches. In some embodiments, the first length L1 is 10 inches to 20 inches. In some embodiments, the first length L1 is 10 inches to 15 inches.

In some embodiments, the first length L1 is 15 inches to 40 inches. In some embodiments, the first length L1 is 15 inches to 35 inches. In some embodiments, the first length L1 is 15 inches to 30 inches. In some embodiments, the first length L1 is 15 inches to 25 inches. In some embodiments, the first length L1 is 15 inches to 20 inches.

In some embodiments, the first length L1 is 20 inches to 40 inches. In some embodiments, the first length L1 is 20 inches to 35 inches. In some embodiments, the first length L1 is 20 inches to 30 inches. In some embodiments, the first length L1 is 20 inches to 25 inches. In some embodiments, the first length L1 is 25 inches to 40 inches. In some embodiments, the first length L1 is 25 inches to 35 inches. In some embodiments, the first length L1 is 25 inches to 30 inches. In some embodiments, the first length L1 is 30 inches to 40 inches. In some embodiments, the first length L1 is 30 inches to 35 inches. In some embodiments, the first length L1 is 35 inches to 40 inches.

In some embodiments, the first length L1 is 4 inches. In some embodiments, the first length L1 is 5 inches. In some embodiments, the first length L1 is 10 inches. In some embodiments, the first length L1 is 15 inches. In some embodiments, the first length L1 is 20 inches. In some embodiments, the first length L1 is 25 inches. In some embodiments, the first length L1 is 30 inches. In some embodiments, the first length L1 is 35 inches. In some embodiments, the first length L1 is 40 inches.

In some embodiments, each of the first side 38 and the second side 40 includes a first width W1. In some embodiments, the first width W1 is 5 inches to 25 inches. In some embodiments, the first width W1 is 5 inches to 20 inches. In some embodiments, the first width W1 is 5 inches to 15 inches. In some embodiments, the first width W1 is 5 inches to 10 inches. In some embodiments, the first width W1 is 10 inches to 25 inches. In some embodiments, the first width W1 is 10 inches to 20 inches. In some embodiments, the first width W1 is 10 inches to 15 inches. In some embodiments, the first width W1 is 15 inches to 25 inches. In some embodiments, the first width W1 is 15 inches to 20 inches. In some embodiments, the first width W1 is 20 inches to 25 inches.

In some embodiments, the first width W1 is 5 inches. In some embodiments, the first width W1 is 6 inches. In some embodiments, the first width W1 is 7 inches. In some embodiments, the first width W1 is 8 inches. In some embodiments, the first width W1 is 9 inches. In some embodiments, the first width W1 is 10 inches. In some embodiments, the first width W1 is 11 inches. In some embodiments, the first width W1 is 12 inches. In some embodiments, the first width W1 is 13 inches. In some embodiments, the first width W1 is 14 inches. In some embodiments, the first width W1 is 15 inches. In some embodiments, the first width W1 is 16 inches. In some embodiments, the first width W1 is 17 inches. In some embodiments, the first width W1 is 18 inches. In some embodiments, the first width W1 is 19 inches. In some embodiments, the first width W1 is 20 inches.

In some embodiments, the step flap 36 includes an area of 20 square inches to 1,000 square inches. In some embodiments, the step flap 36 includes an area of 20 square inches to 900 square inches. In some embodiments, the step flap 36 includes an area of 20 square inches to 800 square inches. In some embodiments, the step flap 36 includes an area of 20 square inches to 700 square inches. In some embodiments, the step flap 36 includes an area of 20 square inches to 600 square inches. In some embodiments, the step flap 36 includes an area of 20 square inches to 500 square inches. In some embodiments, the step flap 36 includes an area of 20 square inches to 400 square inches. In some embodiments, the step flap 36 includes an area of 20 square inches to 300 square inches. In some embodiments, the step flap 36 includes an area of 20 square inches to 200 square inches. In some embodiments, the step flap 36 includes an area of 20 square inches to 100 square inches.

In some embodiments, the step flap 36 includes an area of 100 square inches to 1,000 square inches. In some embodiments, the step flap 36 includes an area of 100 square inches to 900 square inches. In some embodiments, the step flap 36 includes an area of 100 square inches to 800 square inches. In some embodiments, the step flap 36 includes an area of 100 square inches to 700 square inches. In some embodiments, the step flap 36 includes an area of 100 square inches to 600 square inches. In some embodiments, the step flap 36 includes an area of 100 square inches to 500 square inches. In some embodiments, the step flap 36 includes an area of 100 square inches to 400 square inches. In some embodiments, the step flap 36 includes an area of 100 square inches to 300 square inches. In some embodiments, the step flap 36 includes an area of 100 square inches to 200 square inches.

In some embodiments, the step flap 36 includes an area of 200 square inches to 1,000 square inches. In some embodiments, the step flap 36 includes an area of 200 square inches to 900 square inches. In some embodiments, the step flap 36 includes an area of 200 square inches to 800 square inches. In some embodiments, the step flap 36 includes an area of 200 square inches to 700 square inches. In some embodiments, the step flap 36 includes an area of 200 square inches to 600 square inches. In some embodiments, the step flap 36 includes an area of 200 square inches to 500 square inches. In some embodiments, the step flap 36 includes an area of 200 square inches to 400 square inches. In some embodiments, the step flap 36 includes an area of 200 square inches to 300 square inches.

In some embodiments, the step flap 36 includes an area of 300 square inches to 1,000 square inches. In some embodiments, the step flap 36 includes an area of 300 square inches to 900 square inches. In some embodiments, the step flap 36 includes an area of 300 square inches to 800 square inches. In some embodiments, the step flap 36 includes an area of 300 square inches to 700 square inches. In some embodiments, the step flap 36 includes an area of 300 square inches to 600 square inches. In some embodiments, the step flap 36 includes an area of 300 square inches to 500 square inches. In some embodiments, the step flap 36 includes an area of 300 square inches to 400 square inches.

In some embodiments, the step flap 36 includes an area of 400 square inches to 1,000 square inches. In some embodiments, the step flap 36 includes an area of 400 square inches to 900 square inches. In some embodiments, the step flap 36 includes an area of 400 square inches to 800 square inches. In some embodiments, the step flap 36 includes an area of 400 square inches to 700 square inches. In some embodiments, the step flap 36 includes an area of 400 square inches to 600 square inches. In some embodiments, the step flap 36 includes an area of 400 square inches to 500 square inches.

In some embodiments, the step flap 36 includes an area of 500 square inches to 1,000 square inches. In some embodiments, the step flap 36 includes an area of 500 square inches to 900 square inches. In some embodiments, the step flap 36 includes an area of 500 square inches to 800 square inches. In some embodiments, the step flap 36 includes an area of 500 square inches to 700 square inches. In some embodiments, the step flap 36 includes an area of 500 square inches to 600 square inches. In some embodiments, the step flap 36 includes an area of 600 square inches to 1,000 square inches. In some embodiments, the step flap 36 includes an area of 600 square inches to 900 square inches. In some embodiments, the step flap 36 includes an area of 600 square inches to 800 square inches. In some embodiments, the step flap 36 includes an area of 600 square inches to 700 square inches.

In some embodiments, the step flap 36 includes an area of 700 square inches to 1,000 square inches. In some embodiments, the step flap 36 includes an area of 700 square inches to 900 square inches. In some embodiments, the step flap 36 includes an area of 700 square inches to 800 square inches.

In some embodiments, the step flap 36 includes an area of 800 square inches to 1,000 square inches. In some embodiments, the step flap 36 includes an area of 800 square inches to 900 square inches. In some embodiments, the step flap 36 includes an area of 900 square inches to 1,000 square inches.

In some embodiments, the step flap 36 includes an area of 20 square inches. In some embodiments, the step flap 36 includes an area of 100 square inches. In some embodiments, the step flap 36 includes an area of 200 square inches. In some embodiments, the step flap 36 includes an area of 300 square inches. In some embodiments, the step flap 36 includes an area of 400 square inches. In some embodiments, the step flap 36 includes an area of 500 square inches. In some embodiments, the step flap 36 includes an area of 600 square inches. In some embodiments, the step flap 36 includes an area of 700 square inches. In some embodiments, the step flap 36 includes an area of 800 square inches. In some embodiments, the step flap 36 includes an area of 900 square inches. In some embodiments, the step flap 36 includes an area of 1,000 square inches.

In some embodiments, the step flap 36 includes a polymer. In some embodiments, the step flap 36 includes thermoplastic polyolefin (TPO). In other embodiments, each of the first layer 12 and the step flap 36 includes polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers—ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the step flap 36 is made of metal. In some embodiments, the step flap 36 is made of aluminum. In some embodiments, the step flap 36 is made of asphalt.

In some embodiments, the step flap 36 includes a thickness of 0.1 mm to 5 mm. In some embodiments, the step flap 36 includes a thickness of 0.1 mm to 4.5 mm. In some embodiments, the step flap 36 includes a thickness of 0.1 mm to 4 mm. In some embodiments, the step flap 36 includes a thickness of 0.1 mm to 3.5 mm. In some embodiments, the step flap 36 includes a thickness of 0.1 mm to 3 mm. In some embodiments, the step flap 36 includes a thickness of 0.1 mm to 2.5 mm. In some embodiments, the step flap 36 includes a thickness of 0.1 mm to 2 mm. In some embodiments, the step flap 36 includes a thickness of 0.1 mm to 1.5 mm. In some embodiments, the step flap 36 includes a thickness of 0.1 mm to 1 mm. In some embodiments, the step flap 36 includes a thickness of 0.1 mm to 0.5 mm.

In some embodiments, the step flap 36 includes a thickness of 0.5 mm to 5 mm. In some embodiments, the step flap 36 includes a thickness of 0.5 mm to 4.5 mm. In some embodiments, the step flap 36 includes a thickness of 0.5 mm to 4 mm. In some embodiments, the step flap 36 includes a thickness of 0.5 mm to 3.5 mm. In some embodiments, the step flap 36 includes a thickness of 0.5 mm to 3 mm. In some embodiments, the step flap 36 includes a thickness of 0.5 mm to 2.5 mm. In some embodiments, the step flap 36 includes a thickness of 0.5 mm to 2 mm. In some embodiments, the step flap 36 includes a thickness of 0.5 mm to 1.5 mm. In some embodiments, the step flap 36 includes a thickness of 0.5 mm to 1 mm.

In some embodiments, the step flap 36 includes a thickness of 1 mm to 5 mm. In some embodiments, the step flap 36 includes a thickness of 1 mm to 4.5 mm. In some embodiments, the step flap 36 includes a thickness of 1 mm to 4 mm. In some embodiments, the step flap 36 includes a thickness of 1 mm to 3.5 mm. In some embodiments, the step flap 36 includes a thickness of 1 mm to 3 mm. In some embodiments, the step flap 36 includes a thickness of 1 mm to 2.5 mm. In some embodiments, the step flap 36 includes a thickness of 1 mm to 2 mm. In some embodiments, the step flap 36 includes a thickness of 1 mm to 1.5 mm.

In some embodiments, the step flap 36 includes a thickness of 1.5 mm to 5 mm. In some embodiments, the step flap 36 includes a thickness of 1.5 mm to 4.5 mm. In some embodiments, the step flap 36 includes a thickness of 1.5 mm to 4 mm. In some embodiments, the step flap 36 includes a thickness of 1.5 mm to 3.5 mm. In some embodiments, the step flap 36 includes a thickness of 1.5 mm to 3 mm. In some embodiments, the step flap 36 includes a thickness of 1.5 mm to 2.5 mm. In some embodiments, the step flap 36 includes a thickness of 1.5 mm to 2 mm.

In some embodiments, the step flap 36 includes a thickness of 2 mm to 5 mm. In some embodiments, the step flap 36 includes a thickness of 2 mm to 4.5 mm. In some embodiments, the step flap 36 includes a thickness of 2 mm to 4 mm. In some embodiments, the step flap 36 includes a thickness of 2 mm to 3.5 mm. In some embodiments, the step flap 36 includes a thickness of 2 mm to 3 mm. In some embodiments, the step flap 36 includes a thickness of 2 mm to 2.5 mm.

In some embodiments, the step flap 36 includes a thickness of 2.5 mm to 5 mm. In some embodiments, the step flap 36 includes a thickness of 2.5 mm to 4.5 mm. In some embodiments, the step flap 36 includes a thickness of 2.5 mm to 4 mm. In some embodiments, the step flap 36 includes a thickness of 2.5 mm to 3.5 mm. In some embodiments, the step flap 36 includes a thickness of 2.5 mm to 3 mm.

In some embodiments, the step flap 36 includes a thickness of 3 mm to 5 mm. In some embodiments, the step flap 36 includes a thickness of 3 mm to 4.5 mm. In some embodiments, the step flap 36 includes a thickness of 3 mm to 4 mm. In some embodiments, the step flap 36 includes a thickness of 3 mm to 3.5 mm. In some embodiments, the step flap 36 includes a thickness of 3.5 mm to 5 mm. In some embodiments, the step flap 36 includes a thickness of 3.5 mm to 4.5 mm. In some embodiments, the step flap 36 includes a thickness of 3.5 mm to 4 mm. In some embodiments, the step flap 36 includes a thickness of 4 mm to 5 mm. In some embodiments, the step flap 36 includes a thickness of 4 mm to 4.5 mm. In some embodiments, the step flap 36 includes a thickness of 4.5 mm to 5 mm.

In some embodiments, the step flap 36 includes a thickness of 0.1 mm. In some embodiments, the step flap 36 includes a thickness of 0.5 mm. In some embodiments, the step flap 36 includes a thickness of 1 mm. In some embodiments, the step flap 36 includes a thickness of 1.5 mm. In some embodiments, the step flap 36 includes a thickness of 2 mm. In some embodiments, the step flap 36 includes a thickness of 2.5 mm. In some embodiments, the step flap 36 includes a thickness of 3 mm. In some embodiments, the step flap 36 includes a thickness of 3.5 mm. In some embodiments, the step flap 36 includes a thickness of 4 mm. In some embodiments, the step flap 36 includes a thickness of 4.5 mm. In some embodiments, the step flap 36 includes a thickness of 5 mm.

Referring to FIG. 3, in some embodiments, the step flap 36 includes at least one timing mark 48 on the surface 46. In some embodiments, the at least one timing mark 48 includes a first timing mark 48a extending from the first edge 42 to the second edge 44 and between the first side 38 and the second side 40. In some embodiments, the first timing mark 48a extends substantially midway between the first edge 42 and the second edge 44. In some embodiments, the at least one timing mark 48 includes a second timing mark 48b extending from the first side 38 to the second side 40 and between the first edge 42 and the second edge 44. In some embodiments, the second timing mark 48b extends substantially midway between the first side 38 and the second side 40.

In some embodiments, the surface 46 of the step flap 36 includes an adhesive. In some embodiments, at least a portion of the surface 46 includes the adhesive. In some embodiments, the entire surface 46 includes the adhesive. In some embodiments, the surface 46 includes at least one release line 50. In some embodiments, the at least one release line 50 extends from the first edge 42 to the second edge 44 and between the first side 38 and the second side 40. In some embodiments, the at least one release line 50 extends between the first side 38 and the first timing mark 48a. In some embodiments, the at least one release line 50 extends between the first timing mark 48a and the second side 40. In some embodiments, the at least one release line 50 includes a plurality of release lines 50a, 50b. In some embodiments, the at least one release line 50 is located at a distance of 5 inches to 10 inches from the first side 38. In some embodiments, the at least one release line 50 is located at a distance of 5 inches to 10 inches from the second side 40. In some embodiments, the at least one release line 50 extends from the second In some embodiments, the at least one release line 50 is a guideline for alignment and a position of at least one sheet of film 52 removably attached to the surface 46. In some embodiments, the film 52 is a peel and stick film sheet. In some embodiments, the film 52 is composed of EverGuard Freedom HW peel and stick membrane manufactured by GAF.

Figure 4:
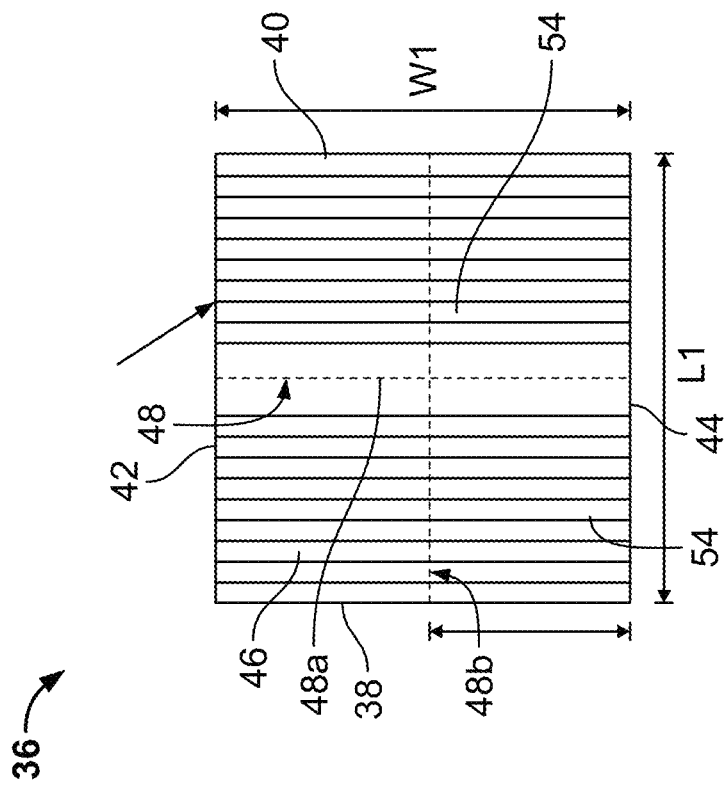
FIGS. 3 and 4 are top plan views of embodiments of a step flap.
Figure 5:
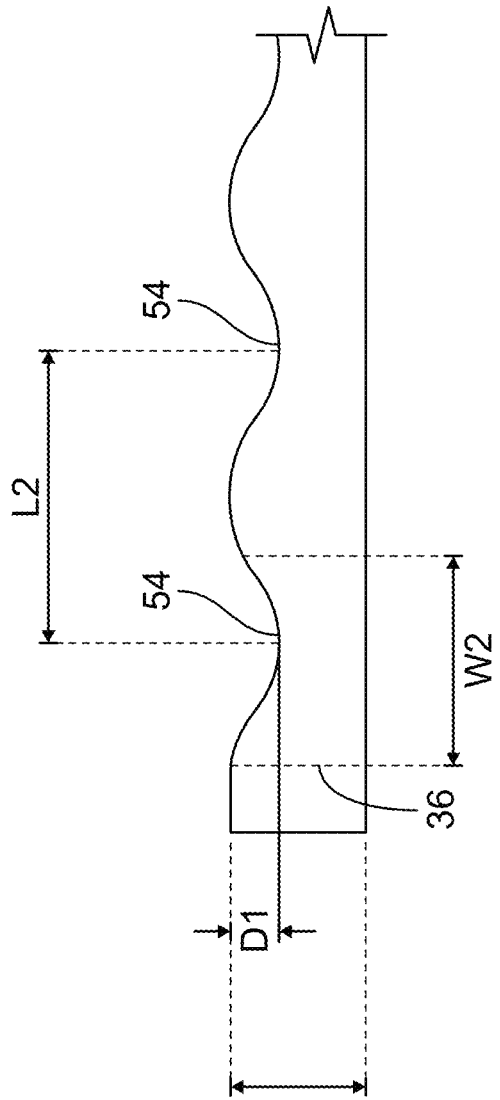
FIG. 5 is a schematic side view of a portion of the step flap shown in FIG. 4.

Referring to FIGS. 4 and 5, in some embodiments, the step flap 36 includes at least one channel 54 located within the surface 46. In some embodiments, the at least one channel 54 extends from the first edge 42 to the second edge 44. In some embodiments, the at least one channel 54 includes a plurality of channels. In some embodiments, the at least one channel 54 is configured to channel water.

In some embodiments, a depth D1 of each of the at least one channel 54 is 0.1 mm to 5 mm. In some embodiments, a depth D1 of each of the at least one channel 54 is 0.1 mm to 4.5 mm. In some embodiments, a depth D1 of each of the at least one channel 54 is 0.1 mm to 4 mm. In some embodiments, a depth D1 of each of the at least one channel 54 is 0.1 mm to 3.5 mm. In some embodiments, a depth D1 of each of the at least one channel 54 is 0.1 mm to 3 mm. In some embodiments, a depth D1 of each of the at least one channel 54 is 0.1 mm to 2.5 mm. In some embodiments, a depth D1 of each of the at least one channel 54 is 0.1 mm to 2 mm. In some embodiments, a depth D1 of each of the at least one channel 54 is 0.1 mm to 1.5 mm. In some embodiments, a depth D1 of each of the at least one channel 54 is 0.1 mm to 1 mm. In some embodiments, a depth D1 of each of the at least one channel 54 is 0.1 mm to 0.5 mm.

In some embodiments, a depth D1 of each of the at least one channel 54 is 0.5 mm to 5 mm. In some embodiments, a depth D1 of each of the at least one channel 54 is 0.5 mm to 4.5 mm. In some embodiments, a depth D1 of each of the at least one channel 54 is 0.5 mm to 4 mm. In some embodiments, a depth D1 of each of the at least one channel 54 is 0.5 mm to 3.5 mm. In some embodiments, a depth D1 of each of the at least one channel 54 is 0.5 mm to 3 mm. In some embodiments, a depth D1 of each of the at least one channel 54 is 0.5 mm to 2.5 mm. In some embodiments, a depth D1 of each of the at least one channel 54 is 0.5 mm to 2 mm. In some embodiments, a depth D1 of each of the at least one channel 54 is 0.5 mm to 1.5 mm. In some embodiments, a depth D1 of each of the at least one channel 54 is 0.5 mm to 1 mm.

In some embodiments, a depth D1 of each of the at least one channel 54 is 1 mm to 5 mm. In some embodiments, a depth D1 of each of the at least one channel 54 is 1 mm to 4.5 mm. In some embodiments, a depth D1 of each of the at least one channel 54 is 1 mm to 4 mm. In some embodiments, a depth D1 of each of the at least one channel 54 is 1 mm to 3.5 mm. In some embodiments, a depth D1 of each of the at least one channel 54 is 1 mm to 3 mm. In some embodiments, a depth D1 of each of the at least one channel 54 is 1 mm to 2.5 mm. In some embodiments, a depth D1 of each of the at least one channel 54 is 1 mm to 2 mm. In some embodiments, a depth D1 of each of the at least one channel 54 is 1 mm to 1.5 mm.

In some embodiments, a depth D1 of each of the at least one channel 54 is 1.5 mm to 5 mm. In some embodiments, a depth D1 of each of the at least one channel 54 is 1.5 mm to 4.5 mm. In some embodiments, a depth D1 of each of the at least one channel 54 is 1.5 mm to 4 mm. In some embodiments, a depth D1 of each of the at least one channel 54 is 1.5 mm to 3.5 mm. In some embodiments, a depth D1 of each of the at least one channel 54 is 1.5 mm to 3 mm. In some embodiments, a depth D1 of each of the at least one channel 54 is 1.5 mm to 2.5 mm. In some embodiments, a depth D1 of each of the at least one channel 54 is 1.5 mm to 2 mm.

In some embodiments, a depth D1 of each of the at least one channel 54 is 2 mm to 5 mm. In some embodiments, a depth D1 of each of the at least one channel 54 is 2 mm to 4.5 mm. In some embodiments, a depth D1 of each of the at least one channel 54 is 2 mm to 4 mm. In some embodiments, a depth D1 of each of the at least one channel 54 is 2 mm to 3.5 mm. In some embodiments, a depth D1 of each of the at least one channel 54 is 2 mm to 3 mm. In some embodiments, a depth D1 of each of the at least one channel 54 is 2 mm to 2.5 mm.

In some embodiments, a depth D1 of each of the at least one channel 54 is 2.5 mm to 5 mm. In some embodiments, a depth D1 of each of the at least one channel 54 is 2.5 mm to 4.5 mm. In some embodiments, a depth D1 of each of the at least one channel 54 is 2.5 mm to 4 mm. In some embodiments, a depth D1 of each of the at least one channel 54 is 2.5 mm to 3.5 mm. In some embodiments, a depth D1 of each of the at least one channel 54 is 2.5 mm to 3 mm.

In some embodiments, a depth D1 of each of the at least one channel 54 is 3 mm to 5 mm. In some embodiments, a depth D1 of each of the at least one channel 54 is 3 mm to 4.5 mm. In some embodiments, a depth D1 of each of the at least one channel 54 is 3 mm to 4 mm. In some embodiments, a depth D1 of each of the at least one channel 54 is 3 mm to 3.5 mm. In some embodiments, a depth D1 of each of the at least one channel 54 is 3.5 mm to 5 mm. In some embodiments, a depth D1 of each of the at least one channel 54 is 3.5 mm to 4.5 mm. In some embodiments, a depth D1 of each of the at least one channel 54 is 3.5 mm to 4 mm. In some embodiments, a depth D1 of each of the at least one channel 54 is 4 mm to 5 mm. In some embodiments, a depth D1 of each of the at least one channel 54 is 4 mm to 4.5 mm. In some embodiments, a depth D1 of each of the at least one channel 54 is 4.5 mm to 5 mm.

In some embodiments, a depth D1 of each of the at least one channel 54 is 0.1 mm. In some embodiments, a depth D1 of each of the at least one channel 54 is 0.5 mm. In some embodiments, a depth D1 of each of the at least one channel 54 is 1 mm. In some embodiments, a depth D1 of each of the at least one channel 54 is 1.5 mm. In some embodiments, a depth D1 of each of the at least one channel 54 is 2 mm. In some embodiments, a depth D1 of each of the at least one channel 54 is 2.5 mm. In some embodiments, a depth D1 of each of the at least one channel 54 is 3 mm. In some embodiments, a depth D1 of each of the at least one channel 54 is 3.5 mm. In some embodiments, a depth D1 of each of the at least one channel 54 is 4 mm. In some embodiments, a depth D1 of each of the at least one channel 54 is 4.5 mm. In some embodiments, a depth D1 of each of the at least one channel 54 is 5 mm.

In some embodiments, a width W2 of each of the at least one channel 54 is 0.1 mm to 100 mm. In some embodiments, a width W2 of each of the at least one channel 54 is 0.1 mm to 90 mm. In some embodiments, a width W2 of each of the at least one channel 54 is 0.1 mm to 80 mm. In some embodiments, a width W2 of each of the at least one channel 54 is 0.1 mm to 70 mm. In some embodiments, a width W2 of each of the at least one channel 54 is 0.1 mm to 60 mm. In some embodiments, a width W2 of each of the at least one channel 54 is 0.1 mm to 50 mm. In some embodiments, a width W2 of each of the at least one channel 54 is 0.1 mm to 40 mm. In some embodiments, a width W2 of each of the at least one channel 54 is 0.1 mm to 30 mm. In some embodiments, a width W2 of each of the at least one channel 54 is 0.1 mm to 20 mm. In some embodiments, a width W2 of each of the at least one channel 54 is 0.1 mm to 10 mm.

In some embodiments, a width W2 of each of the at least one channel 54 is 10 mm to 100 mm. In some embodiments, a width W2 of each of the at least one channel 54 is 10 mm to 90 mm. In some embodiments, a width W2 of each of the at least one channel 54 is 10 mm to 80 mm. In some embodiments, a width W2 of each of the at least one channel 54 is 10 mm to 70 mm. In some embodiments, a width W2 of each of the at least one channel 54 is 10 mm to 60 mm. In some embodiments, a width W2 of each of the at least one channel 54 is 10 mm to 50 mm. In some embodiments, a width W2 of each of the at least one channel 54 is 10 mm to 40 mm. In some embodiments, a width W2 of each of the at least one channel 54 is 10 mm to 30 mm. In some embodiments, a width W2 of each of the at least one channel 54 is 10 mm to 20 mm.

In some embodiments, a width W2 of each of the at least one channel 54 is 20 mm to 100 mm. In some embodiments, a width W2 of each of the at least one channel 54 is 20 mm to 90 mm. In some embodiments, a width W2 of each of the at least one channel 54 is 20 mm to 80 mm. In some embodiments, a width W2 of each of the at least one channel 54 is 20 mm to 70 mm. In some embodiments, a width W2 of each of the at least one channel 54 is 20 mm to 60 mm. In some embodiments, a width W2 of each of the at least one channel 54 is 20 mm to 50 mm. In some embodiments, a width W2 of each of the at least one channel 54 is 20 mm to 40 mm. In some embodiments, a width W2 of each of the at least one channel 54 is 20 mm to 30 mm.

In some embodiments, a width W2 of each of the at least one channel 54 is 30 mm to 100 mm. In some embodiments, a width W2 of each of the at least one channel 54 is 30 mm to 90 mm. In some embodiments, a width W2 of each of the at least one channel 54 is 30 mm to 80 mm. In some embodiments, a width W2 of each of the at least one channel 54 is 30 mm to 70 mm. In some embodiments, a width W2 of each of the at least one channel 54 is 30 mm to 60 mm. In some embodiments, a width W2 of each of the at least one channel 54 is 30 mm to 50 mm. In some embodiments, a width W2 of each of the at least one channel 54 is 30 mm to 40 mm.

In some embodiments, a width W2 of each of the at least one channel 54 is 40 mm to 100 mm. In some embodiments, a width W2 of each of the at least one channel 54 is 40 mm to 90 mm. In some embodiments, a width W2 of each of the at least one channel 54 is 40 mm to 80 mm. In some embodiments, a width W2 of each of the at least one channel 54 is 40 mm to 70 mm. In some embodiments, a width W2 of each of the at least one channel 54 is 40 mm to 60 mm. In some embodiments, a width W2 of each of the at least one channel 54 is 40 mm to 50 mm.

In some embodiments, a width W2 of each of the at least one channel 54 is 50 mm to 100 mm. In some embodiments, a width W2 of each of the at least one channel 54 is 50 mm to 90 mm. In some embodiments, a width W2 of each of the at least one channel 54 is 50 mm to 80 mm. In some embodiments, a width W2 of each of the at least one channel 54 is 50 mm to 70 mm. In some embodiments, a width W2 of each of the at least one channel 54 is 50 mm to 60 mm.

In some embodiments, a width W2 of each of the at least one channel 54 is 60 mm to 100 mm. In some embodiments, a width W2 of each of the at least one channel 54 is 60 mm to 90 mm. In some embodiments, a width W2 of each of the at least one channel 54 is 60 mm to 80 mm. In some embodiments, a width W2 of each of the at least one channel 54 is 60 mm to 70 mm. In some embodiments, a width W2 of each of the at least one channel 54 is 70 mm to 100 mm. In some embodiments, a width W2 of each of the at least one channel 54 is 70 mm to 90 mm. In some embodiments, a width W2 of each of the at least one channel 54 is 70 mm to 80 mm. In some embodiments, a width W2 of each of the at least one channel 54 is 80 mm to 100 mm. In some embodiments, a width W2 of each of the at least one channel 54 is 80 mm to 90 mm. In some embodiments, a width W2 of each of the at least one channel 54 is 90 mm to 100 mm.

In some embodiments, a distance L2 measured from one midpoint of one of the at least one channel 54 to a midpoint of another adjacent one of the at least one channel 54 is 3 mm to 25 mm. In some embodiments, a distance L2 measured from one midpoint of one of the at least one channel 54 to a midpoint of another adjacent one of the at least one channel 54 is 3 mm to 20 mm. In some embodiments, a distance L2 measured from one midpoint of one of the at least one channel 54 to a midpoint of another adjacent one of the at least one channel 54 is 3 mm to 15 mm. In some embodiments, a distance L2 measured from one midpoint of one of the at least one channel 54 to a midpoint of another adjacent one of the at least one channel 54 is 3 mm to 10 mm. In some embodiments, a distance L2 measured from one midpoint of one of the at least one channel 54 to a midpoint of another adjacent one of the at least one channel 54 is 3 mm to 5 mm.

In some embodiments, a distance L2 measured from one midpoint of one of the at least one channel 54 to a midpoint of another adjacent one of the at least one channel 54 is 5 mm to 25 mm. In some embodiments, a distance L2 measured from one midpoint of one of the at least one channel 54 to a midpoint of another adjacent one of the at least one channel 54 is 5 mm to 20 mm. In some embodiments, a distance L2 measured from one midpoint of one of the at least one channel 54 to a midpoint of another adjacent one of the at least one channel 54 is 5 mm to 15 mm. In some embodiments, a distance L2 measured from one midpoint of one of the at least one channel 54 to a midpoint of another adjacent one of the at least one channel 54 is 5 mm to 10 mm.

In some embodiments, a distance L2 measured from one midpoint of one of the at least one channel 54 to a midpoint of another adjacent one of the at least one channel 54 is 10 mm to 25 mm. In some embodiments, a distance L2 measured from one midpoint of one of the at least one channel 54 to a midpoint of another adjacent one of the at least one channel 54 is 10 mm to 20 mm. In some embodiments, a distance L2 measured from one midpoint of one of the at least one channel 54 to a midpoint of another adjacent one of the at least one channel 54 is 10 mm to 15 mm. In some embodiments, a distance L2 measured from one midpoint of one of the at least one channel 54 to a midpoint of another adjacent one of the at least one channel 54 is 15 mm to 25 mm. In some embodiments, a distance L2 measured from one midpoint of one of the at least one channel 54 to a midpoint of another adjacent one of the at least one channel 54 is 15 mm to 20 mm. In some embodiments, a distance L2 measured from one midpoint of one of the at least one channel 54 to a midpoint of another adjacent one of the at least one channel 54 is 20 mm to 25 mm.

Figure 6A:
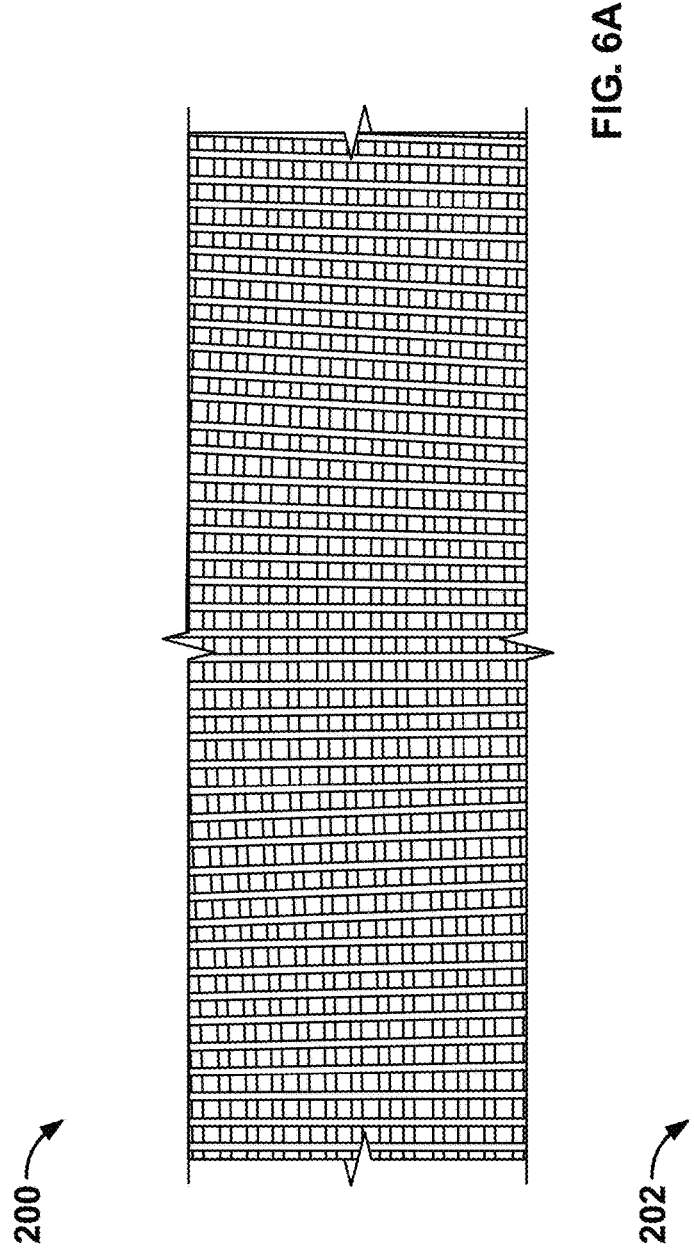
FIGS. 6A and 6B are illustrations of embodiments of scrims employed by the photovoltaic shingles of FIGS. 1 and 2A through 2C.
Figure 6B:
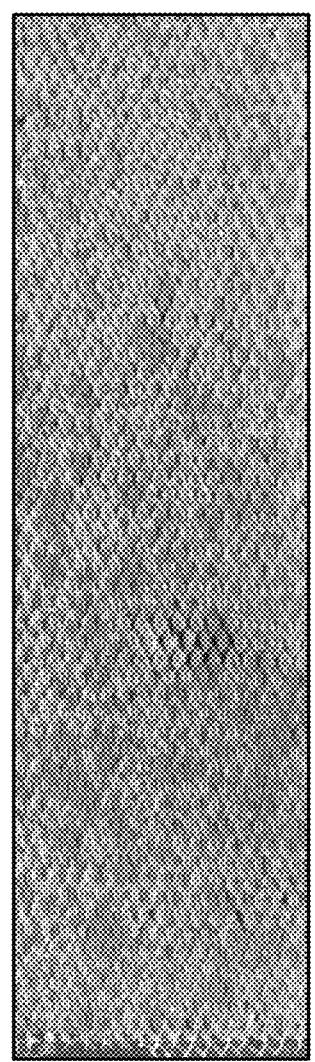

In some embodiments, the step flap 36 includes a scrim located on the surface 46. In some embodiments, the scrim is composed of a sheet of mesh material, such as, but not limited to, the mesh materials 150, 152 shown in FIGS. 6A and 6B. In some embodiments, the scrim includes fiberglass mesh. In some embodiments, the scrim includes a carbon fiber composite. In some embodiments, the scrim include a polymer. In some embodiments, the scrim includes a textile material. In some embodiments, the scrim is laminated with the step flap 36. In some embodiments, the scrim is attached to the step flap 36 by an adhesive. In some embodiments, the scrim is thermally bonded to the step flap 36. In some embodiments, the scrim is located on a second surface opposite the surface 46. In some embodiments, the scrim is configured to prevent water from wicking between overlapping and/or adjacent ones of the photovoltaic shingles 10. In some embodiments, the head lap 26 includes a scrim located on a surface thereof.

Referring to FIGS. 7A through 7E, in some embodiments, the photovoltaic shingle 10 and the step flap 36 are joined to one another. In some embodiments, the photovoltaic shingle 10 overlays the step flap 36. In some embodiments, referring to FIGS. 7A and 7B, one piece (e.g., one-half) of the film 52 is peeled off the step flap 36 to expose a portion 56 of the surface 46 and the corresponding adhesive thereon. In some embodiments, the portion 56 is approximately half of the surface 46. In some embodiments, referring to FIG. 7C, the photovoltaic shingle 10 overlays the portion 56 of the surface 46 and is adhered to the step flap 36. In some embodiments, the surface 46 of the step flap 36 includes an adhesive tape. In some embodiments, the adhesive tape is butyl tape. In some embodiments, the photovoltaic shingle 10 is adhered to the step flap 36 by caulking. In some embodiments, the first end 14 of the photovoltaic shingle 10 overlays the step flap 36. In some embodiments, the first end 14 of the photovoltaic shingle 10 overlays at least a portion of the step flap 36. In some embodiments, the second end 16 of the photovoltaic shingle 10 overlays the step flap 36. In some embodiments, the second end 16 of the photovoltaic shingle 10 overlays at least a portion of the step flap 36.

In some embodiments, the photovoltaic shingle 10 and the step flap 36 are installed on a roof deck 100. In some embodiments, the photovoltaic shingle 10 is installed on the roof deck 100 by a plurality of fasteners. In some embodiments, the plurality of fasteners are installed through the head lap 26. In some embodiments, the plurality of fasteners includes a plurality of nails. In some embodiments, the photovoltaic shingle 10 is installed on the roof deck 100 by an adhesive. In some embodiments, the reveal portion 30 of the photovoltaic shingle 10 overlays the head lap 26 of another one of the photovoltaic shingle 10. In some embodiments, the reveal portion 30 of the photovoltaic shingle 10 overlays the head lap of a roofing shingle 102.

Referring to FIG. 7D, in some embodiments, a remaining piece of the film 52 is peeled off from the surface 46 of the step flap 36, exposing the portion 58 thereof and the adhesive thereon. Referring to FIG. 7E, in some embodiments, a roofing shingle 102 overlays the portion 58 of the surface 46 of the step flap 36 and is attached to the step flap 36. In some embodiments, another of the photovoltaic shingle 10 overlays the portion 58 of the surface 46 of the step flap 36.

In some embodiments, the step flap 36 made from asphalt includes an extension that is positioned beyond a seam between the photovoltaic shingle 10 and an adjacent one of the roofing shingle 102. In some embodiments, the extension is positioned under a joint between the photovoltaic shingle 10 and the adjacent one of the roofing shingle 102.

In some embodiments, the step flap 36 provides watershedding functionality at a butt joint between the photovoltaic shingle 10 and the roofing shingle 102. In some embodiments, the step flap 36 is located under the butt joint between the photovoltaic shingle 10 and the roofing shingle 102. In some embodiments, the step flap 36 under the butt joint sheds water back on top of the photovoltaic module 10 and the roofing shingle 102. In some embodiments, the step flap 36 prevents water from entering an area at a seam between the photovoltaic module 10 and the roofing shingle 102. In some embodiments, the step flap 36 is located under a butt joint between a first photovoltaic shingle 10 and a second photovoltaic shingle 10. In some embodiments, the step flap 36 under the butt joint sheds water back on top of the first photovoltaic shingle 10 and the photovoltaic shingle 10. In some embodiments, the step flap 36 prevents water from entering an area at a seam between the first photovoltaic module 10 and the second photovoltaic module 102.

FIGS. 8A and 8B show an embodiment of the step flap 36 shown in FIG. 5 attached to the photovoltaic shingle 10 and installed on the roof deck 100. In some embodiments, a roofing shingle 102 overlays the step flap 36. In some embodiments, the at least one channel 54 is configured to channel and shed water from the roof deck 100.

Figure 9:
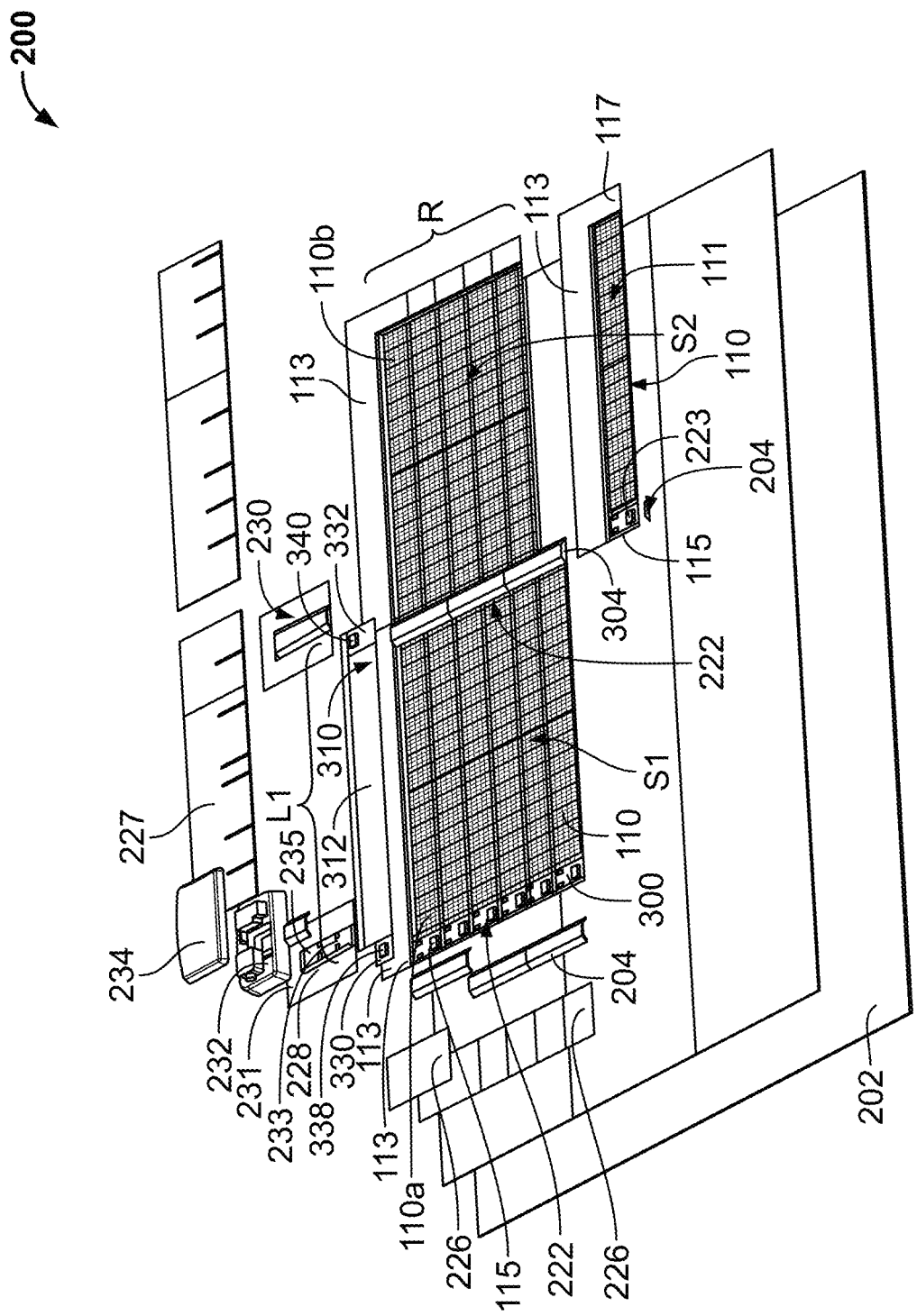
FIG. 9 is an exploded, top perspective view of embodiments of a photovoltaic system incorporating a plurality of step flaps.

Referring to FIG. 9, in some embodiments, a photovoltaic system 200 includes an underlayment layer 204 installed on a roof deck 202. In some embodiments, the photovoltaic system 200 includes a plurality of the photovoltaic modules 110. In some embodiments, the plurality of photovoltaic modules 110 overlay the underlayment layer 204. In some embodiments, the photovoltaic modules 110 are arranged in an array on the roof deck 202. In some embodiments, the array of the photovoltaic modules 110 includes subarrays S1, S2. In certain embodiments, the array includes more than the two subarrays S1, S2. In some embodiments, the array includes a single array S1. In some embodiments, each of the subarrays S1, S2 include a plurality of rows R of the photovoltaic modules 110.

In some embodiments, a reveal portion 111 of one 110a of the photovoltaic modules 110 in the subarray S1 overlays a head lap portion 113 of an adjacent another one of the photovoltaic modules 110*b* of the subarray S1. In some embodiments, at least a portion of a first side lap 115 of the one of the photovoltaic modules 110*a* overlays at least a portion of the first side lap 115 of the another one of the photovoltaic modules 110*b*. In some embodiments, at least a portion of a second side lap 117 of the one of the photovoltaic modules 110*a* overlays at least a portion of the second side lap 117 of the another one of the photovoltaic modules 110*b*. In some embodiments, a wire cover bracket 300 of the photovoltaic module 110*a* overlaps the wire cover bracket 300 of the photovoltaic module 110*b*.

In some embodiments, the reveal portion 111 has a width of 5 inches to 10 inches. In some embodiments, the reveal portion 111 has a width of 5 inches to 9 inches. In some embodiments, the reveal portion 111 has a width of 5 inches to 8 inches. In some embodiments, the reveal portion 111 has a width of 5 inches to 7 inches. In some embodiments, the reveal portion 111 has a width of 5 inches to 6 inches. In some embodiments, the reveal portion 111 has a width of 6 inches to 10 inches. In some embodiments, the reveal portion 111 has a width of 6 inches to 9 inches. In some embodiments, the reveal portion 111 has a width of 6 inches to 8 inches. In some embodiments, the reveal portion 111 has a width of 6 inches to 7 inches. In some embodiments, the reveal portion 111 has a width of 7 inches to 10 inches. In some embodiments, the reveal portion 111 has a width of 7 inches to 9 inches. In some embodiments, the reveal portion 111 has a width of 7 inches to 8 inches. In some embodiments, the reveal portion 111 has a width of 8 inches to 10 inches. In some embodiments, the reveal portion 111 has a width of 8 inches to 9 inches. In some embodiments, the reveal portion 111 has a width of 9 inches to 10 inches.

In some embodiments, the reveal portion 111 has a width of 5 inches. In some embodiments, the reveal portion 111 has a width of 6 inches. In some embodiments, the reveal portion 111 has a width of 7 inches. In some embodiments, the reveal portion 111 has a width of 8 inches. In some embodiments, the reveal portion 111 has a width of 9 inches. In some embodiments, the reveal portion 111 has a width of 10 inches.

In some embodiments, the reveal portion 111 has a length of 35 inches to 75 inches. In some embodiments, the reveal portion 111 has a length of 35 inches to 70 inches. In some embodiments, the reveal portion 111 has a length of 35 inches to 65 inches. In some embodiments, the reveal portion 111 has a length of 35 inches to 60 inches. In some embodiments, the reveal portion 111 has a length of 35 inches to 55 inches. In some embodiments, the reveal portion 111 has a length of 35 inches to 50 inches. In some embodiments, the reveal portion 111 has a length of 35 inches to 45 inches. In some embodiments, the reveal portion 111 has a length of 35 inches to 40 inches.

In some embodiments, the reveal portion 111 has a length of 40 inches to 75 inches. In some embodiments, the reveal portion 111 has a length of 40 inches to 70 inches. In some embodiments, the reveal portion 111 has a length of 40 inches to 65 inches. In some embodiments, the reveal portion 111 has a length of 40 inches to 60 inches. In some embodiments, the reveal portion 111 has a length of 40 inches to 55 inches. In some embodiments, the reveal portion 111 has a length of 40 inches to 50 inches. In some embodiments, the reveal portion 111 has a length of 40 inches to 45 inches. In some embodiments, the reveal portion 111 has a length of 45 inches to 75 inches. In some embodiments, the reveal portion 111 has a length of 45 inches to 70 inches. In some embodiments, the reveal portion 111 has a length of 45 inches to 65 inches. In some embodiments, the reveal portion 111 has a length of 45 inches to 60 inches. In some embodiments, the reveal portion 111 has a length of 45 inches to 55 inches. In some embodiments, the reveal portion 111 has a length of 45 inches to 50 inches.

In some embodiments, the reveal portion 111 has a length of 50 inches to 75 inches. In some embodiments, the reveal portion 111 has a length of 50 inches to 70 inches. In some embodiments, the reveal portion 111 has a length of 50 inches to 65 inches. In some embodiments, the reveal portion 111 has a length of 50 inches to 60 inches. In some embodiments, the reveal portion 111 has a length of 50 inches to 55 inches. In some embodiments, the reveal portion 111 has a length of 55 inches to 75 inches. In some embodiments, the reveal portion 111 has a length of 55 inches to 70 inches. In some embodiments, the reveal portion 111 has a length of 55 inches to 65 inches. In some embodiments, the reveal portion 111 has a length of 55 inches to 60 inches. In some embodiments, the reveal portion 111 has a length of 60 inches to 75 inches. In some embodiments, the reveal portion 111 has a length of 60 inches to 70 inches. In some embodiments, the reveal portion 111 has a length of 60 inches to 65 inches. In some embodiments, the reveal portion 111 has a length of 65 inches to 75 inches. In some embodiments, the reveal portion 111 has a length of 65 inches to 70 inches. In some embodiments, the reveal portion 111 has a length of 70 inches to 75 inches.

In some embodiments, the reveal portion 111 has a length of 35 inches. In some embodiments, the reveal portion 111 has a length of 40 inches. In some embodiments, the reveal portion 111 has a length of 45 inches. In some embodiments, the reveal portion 111 has a length of 50 inches. In some embodiments, the reveal portion 111 has a length of 55 inches. In some embodiments, the reveal portion 111 has a length of 60 inches. In some embodiments, the reveal portion 111 has a length of 65 inches. In some embodiments, the reveal portion 111 has a length of 70 inches. In some embodiments, the reveal portion 111 has a length of 75 inches.

In some embodiments, the first side lap 115 has a length of 1 inch to 5 inches. In some embodiments, the first side lap 115 has a length of 1 inch to 4 inches. In some embodiments, the first side lap 115 has a length of 1 inch to 3 inches. In some embodiments, the first side lap 115 has a length of 1 inch to 2 inches. In some embodiments, the first side lap 115 has a length of 2 inches to 5 inches. In some embodiments, the first side lap 115 has a length of 2 inches to 4 inches. In some embodiments, the first side lap 115 has a length of 2 inches to 3 inches. In some embodiments, the first side lap 115 has a length of 3 inches to 5 inches. In some embodiments, the first side lap 115 has a length of 3 inches to 4 inches. In some embodiments, the first side lap 115 has a length of 4 inches to 5 inches.

In some embodiments, the first side lap 115 has a length of 1 inch. In some embodiments, the first side lap 115 has a length of 2 inches. In some embodiments, the first side lap 115 has a length of 3 inches. In some embodiments, the first side lap 115 has a length of 4 inches. In some embodiments, the first side lap 115 has a length of 5 inches.

In some embodiments, the second side lap 117 has a length of 1 inch to 5 inches. In some embodiments, the second side lap 117 has a length of 1 inch to 4 inches. In some embodiments, the second side lap 117 has a length of 1 inch to 3 inches. In some embodiments, the second side lap 117 has a length of 1 inch to 2 inches. In some embodiments, the second side lap 117 has a length of 2 inches to 5 inches. In some embodiments, the second side lap 117 has a length of 2 inches to 4 inches. In some embodiments, the second side lap 117 has a length of 2 inches to 3 inches. In some embodiments, the second side lap 117 has a length of 3 inches to 5 inches. In some embodiments, the second side lap 117 has a length of 3 inches to 4 inches. In some embodiments, the second side lap 117 has a length of 4 inches to 5 inches.

In some embodiments, the second side lap 117 has a length of 1 inch. In some embodiments, the second side lap 117 has a length of 2 inches. In some embodiments, the second side lap 117 has a length of 3 inches. In some embodiments, the second side lap 117 has a length of 4 inches. In some embodiments, the second side lap 117 has a length of 5 inches.

In some embodiments, the overlay of the first side laps 115 form at least one wireway 222. In some embodiments, the at least one wireway 222 includes a plurality of wireways. In some embodiments, the at least one wireway 222 includes a plurality of the wire cover brackets 300. In some embodiments, the wire cover brackets 300 are aligned in a column.

In some embodiments, at least one of the cover 304 is attached to at least a corresponding one of the wire cover brackets 300. In some embodiments, the at least one cover 304 is removably attached to at least a corresponding one of the wire cover brackets 300. In some embodiments, one of the covers 304 is attached to a plurality of the wire cover brackets 300. In some embodiments, the at least one cover 304 includes a plurality of covers 304. In some embodiments, each of the plurality of covers 304 is configured to removably interlock with one another.

With continued reference to FIG. 9, in some embodiments, the first side lap 115 of one of the photovoltaic modules 110 in the subarray S2 overlays the second side lap 117 of an adjacent another one of the photovoltaic modules 110 in the subarray S1 in the same one of the rows R. In some embodiments, one of jumper modules 310 overlays an uppermost one of the photovoltaic modules 110a in a column of the subarray S1. In some embodiments, an active portion 312 of the jumper module 310 overlays the head lap portion 113 of the photovoltaic module 110a. In some embodiments, the active portion 312 of the jumper module 310 overlays a portion of the head lap portion 113 of the photovoltaic module 110a. In some embodiments, the active portion 312 of the jumper module 310 overlays the entirety of the head lap portion 113 of the photovoltaic module 110a. In some embodiments, a first side lap 330 of the jumper module 310 aligns with the first side lap 115 of the photovoltaic module 110a.

In some embodiments, the second side lap 332 of the jumper module 310 aligns with the second side lap 117 of the photovoltaic module 110a. In some embodiments, a first junction box 338 of the jumper module 310 is electrically connected to a junction box 223 of the photovoltaic module 110a. In some embodiments, a second junction box 340 of the jumper module 310 is electrically connected to the junction box 223 of another of the photovoltaic modules 110b. In some embodiments, the jumper module 310 electrically connects the subarrays S1, S2 of the photovoltaic modules 110 within the array of the photovoltaic system 200. In some embodiments, bus ribbons electrically connect the junction boxes 223 of the first subarray S1 of the photovoltaic modules 110 with the junction boxes 223 of the second subarray S2 of the photovoltaic modules 110.

In some embodiments, with reference to FIGS. 9 and 11, a plurality of step flaps 226 is installed adjacent to one of the subarrays S1 of the photovoltaic modules 110. In some embodiments, each of the step flaps 226 is similar to one or more of the embodiments of the step flaps 36 described above. In some embodiments, each of the photovoltaic modules 110a overlays a corresponding one of the step flaps 226. In some embodiments, each of the photovoltaic modules 110a overlays at least one of the step flaps 226. In some embodiments, each of the photovoltaic modules 110a overlays more than one of the step flaps 226. In some embodiments, each of the photovoltaic modules 110a overlays at least a portion of one of the step flaps 226. In some embodiments, each of the photovoltaic modules 110 overlays a second side of the corresponding one of the step flaps 226.

In some embodiments, roofing shingles 206 are configured to overlay the step flaps 226. In some embodiments, each of the roofing shingles 206 overlays a corresponding one of the step flaps 226. In some embodiments, each of the roofing shingles 206 overlays at least one of the step flaps 226. In some embodiments, each of the roofing shingles 206 overlays more than one of the step flaps 226. In some embodiments, each of the roofing shingles 206 overlays at least a portion of one of the step flaps 226. In some embodiments, each of the roofing shingles 206 overlays a first side of the corresponding one of the step flaps 226. In some embodiments, the roofing shingles 206 are asphalt shingles. In some embodiments, the roofing shingles are electrically inactive solar shingles.

Figure 12A:
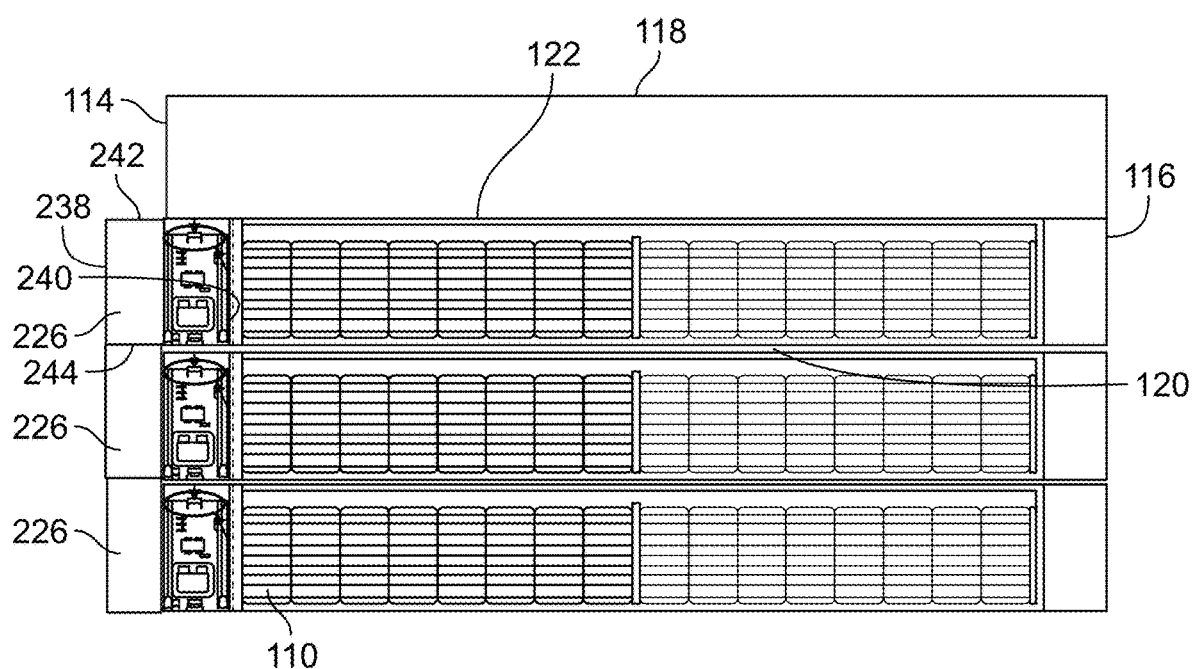
FIGS. 12A, 12B and 13 show embodiments of a photovoltaic system incorporating a plurality step flaps positioned offset relative to a plurality of photovoltaic shingles.
Figure 12B:
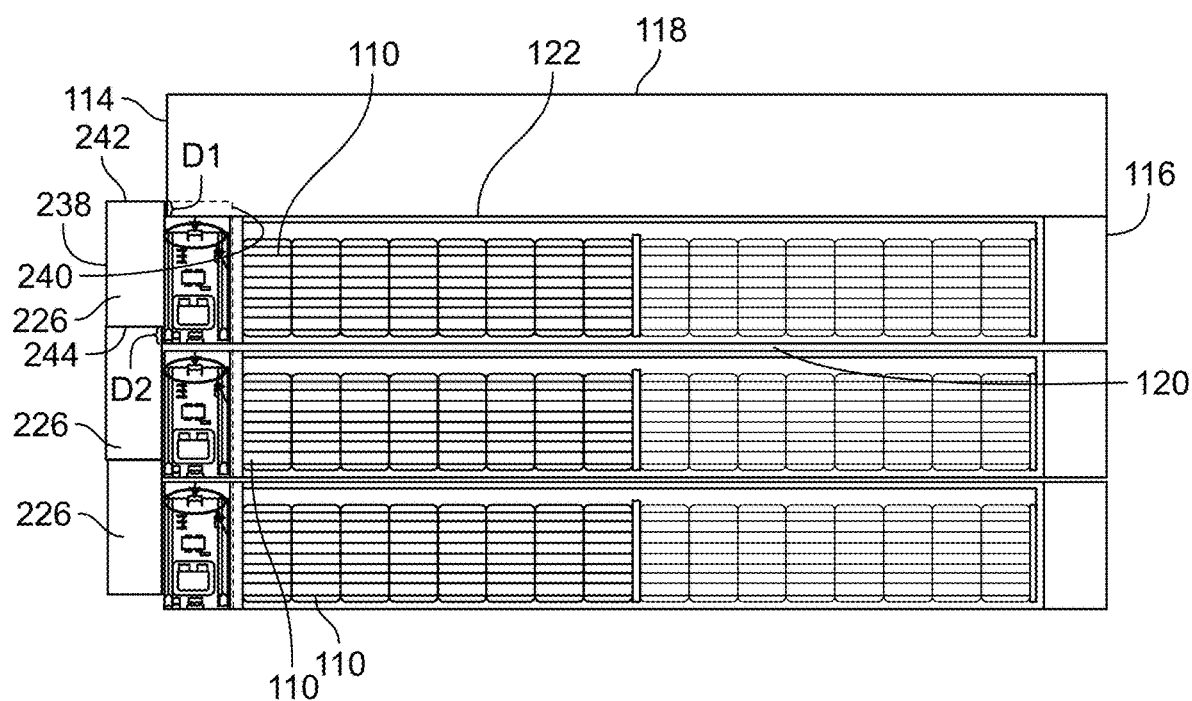

In some embodiments, with reference to FIGS. 12A and 12B, each of the photovoltaic modules 110 includes a first end 114, a second end 116 opposite the first end 114, a first edge 118 extending from the first end 114 to the second end 116, and a second edge 120 opposite the first edge 118 and extending from the first end 114 to the second end 116. In some embodiments, the reveal portion 111 of the photovoltaic module 110 includes a first edge 122 between the first edge 118 and the second edge 120. In some embodiments, the step flap 226 includes a first side 238, a second side 240 opposite the first side 238, a first edge 242 extending from the first side 238 to the second side 240, and a second edge 244 opposite the first edge 242 and extending from the first side 238 to the second side 240.

With reference to FIG. 12A, the second side 240 of each of the step flaps 226 is adjacent to the first end 114 of each of a corresponding one of the photovoltaic modules 110. In some embodiments, the first edge 242 of each of the step flaps 226 is aligned with the first edge 122 of the reveal portion of the corresponding one of the photovoltaic modules 110. In some embodiments, the first edge 242 of each of the step flaps 226 is substantially aligned with the first edge 122 of the reveal portion of the corresponding one of the photovoltaic modules 110. In some embodiments, the second edge 244 of each of the step flaps 226 is aligned with the second edge 120 of the corresponding one of the photovoltaic modules 110. In some embodiments, the second edge 244 of each of the step flaps 226 is substantially aligned with the second edge 120 of the corresponding one of the photovoltaic modules 110.

Figure 13:
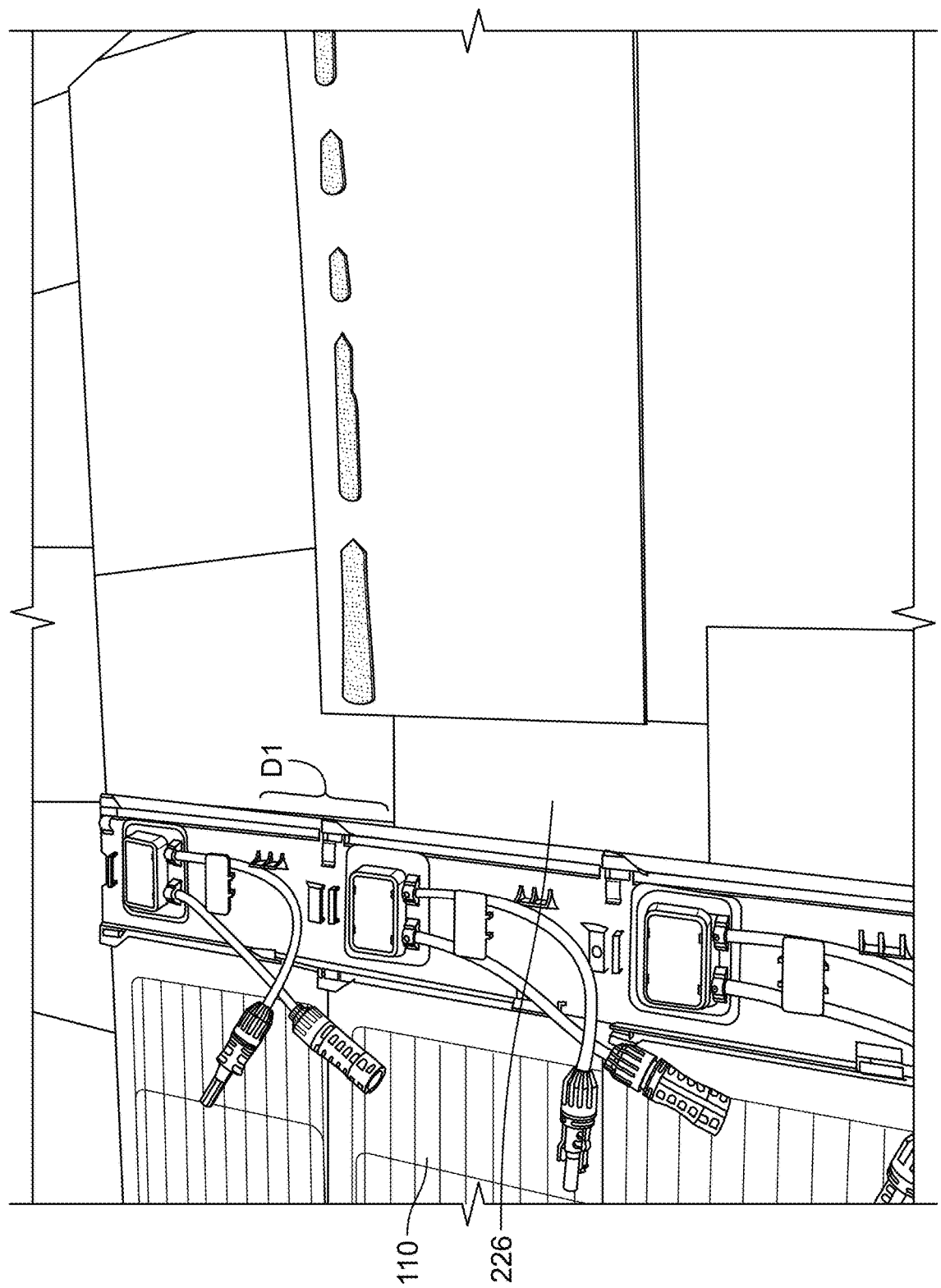

With reference to FIGS. 12B and 13, in some embodiments, the second side 240 of each of the step flaps 226 is adjacent to the first end 114 of at least one of a corresponding one of the photovoltaic modules 110. In some embodiments, the first edge 242 of each of the step flaps 226 is vertically offset from the first edge 122 of the reveal portion of the corresponding one of the photovoltaic modules 110 by a distance D1. In some embodiments, the second edge 244 of each of the step flaps 226 is vertically offset from the second edge 120 of the corresponding one of the photovoltaic modules 110.

In some embodiments, the distance D1 is equal to D2. In some embodiments, the distance D1 is greater than the distance D2. In some embodiments, the distance D1 is less than the distance D2. In some embodiments, the distance D1 is 1 inch to 5 inches. In some embodiments, the distance D1 is 1 inch to 4 inches. In some embodiments, the distance D1 is 1 inch to 3 inches. In some embodiments, the distance D1 is 1 inch to 2 inches. In some embodiments, the distance D1 is 2 inches to 5 inches. In some embodiments, the distance D1 is 2 inches to 4 inches. In some embodiments, the distance D1 is 2 inches to 3 inches. In some embodiments, the distance D1 is 3 inches to 5 inches. In some embodiments, the distance D1 is 3 inches to 4 inches. In some embodiments, the distance D1 is 4 inches to 5 inches. In some embodiments, the distance D2 is 1 inch to 5 inches. In some embodiments, the distance D2 is 1 inch to 4 inches. In some embodiments, the distance D2 is 1 inch to 3 inches. In some embodiments, the distance D2 is 1 inch to 2 inches. In some embodiments, the distance D2 is 2 inches to 5 inches. In some embodiments, the distance D2 is 2 inches to 4 inches. In some embodiments, the distance D2 is 2 inches to 3 inches. In some embodiments, the distance D2 is 3 inches to 5 inches. In some embodiments, the distance D2 is 3 inches to 4 inches. In some embodiments, the distance D2 is 4 inches to 5 inches.

In some embodiments, the step flap 226 is composed of a polymer. In some embodiments, the step flap 226 is composed of thermoplastic polyolefin (TPO). In other embodiments, the step flap 226 is composed of polyethylene terephthalate (PET), polyethylene naphthalate (PEN), polyetheretherketone (PEEK), polyaryletherketone (PAEK), polyarylate (PAR), polyetherimide (PEI), polyarylsulfone (PAS), polyethersulfone (PES), polyamideimide (PAI), or polyimide; polyvinyl chloride (PVC); ethylene propylene diene monomer (EPDM) rubber; silicone rubber; fluoropolymers—ethylene tetrafluoroethylene (ETFE), polyvinylidene fluoride (PVDF), tetrafluoroethylene-hexafluoropropylene copolymers (FEP), and tetrafluoroethylene-hexafluoropropylene-vinylidene fluoride copolymers (THV), or blends thereof.

In some embodiments, the step flap 226 is made of metal. In some embodiments, the step flap 226 is made of aluminum. In some embodiments, the step flap 226 is made of asphalt.

In some embodiments, the step flap 226 comprises a single layer. In some embodiments, the step flap 226 comprises a plurality of layers. In some embodiments, the step flap 226 includes a substrate, a cap layer, and a core. In some embodiments, the step flap 226 includes only a cap layer.

In some embodiments, the step flap 226 has a thickness of 0.1 mm to 5 mm. In some embodiments, the step flap 226 has a thickness of 0.1 mm to 4.5 mm. In some embodiments, the step flap 226 has a thickness of 0.1 mm to 4 mm. In some embodiments, the step flap 226 has a thickness of 0.1 mm to 3.5 mm. In some embodiments, the step flap 226 has a thickness of 0.1 mm to 3 mm. In some embodiments, the step flap 226 has a thickness of 0.1 mm to 2.5 mm. In some embodiments, the step flap 226 has a thickness of 0.1 mm to 2 mm. In some embodiments, the step flap 226 has a thickness of 0.1 mm to 1.5 mm. In some embodiments, the step flap 226 has a thickness of 0.1 mm to 1 mm. In some embodiments, the step flap 226 has a thickness of 0.1 mm to 0.5 mm.

In some embodiments, the step flap 226 has a thickness of 0.5 mm to 5 mm. In some embodiments, the step flap 226 has a thickness of 0.5 mm to 4.5 mm. In some embodiments, the step flap 226 has a thickness of 0.5 mm to 4 mm. In some embodiments, the step flap 226 has a thickness of 0.5 mm to 3.5 mm. In some embodiments, the step flap 226 has a thickness of 0.5 mm to 3 mm. In some embodiments, the step flap 226 has a thickness of 0.5 mm to 2.5 mm. In some embodiments, the step flap 226 has a thickness of 0.5 mm to 2 mm. In some embodiments, the step flap 226 has a thickness of 0.5 mm to 1.5 mm. In some embodiments, the step flap 226 has a thickness of 0.5 mm to 1 mm.

In some embodiments, the step flap 226 has a thickness of 1 mm to 5 mm. In some embodiments, the step flap 226 has a thickness of 1 mm to 4.5 mm. In some embodiments, the step flap 226 has a thickness of 1 mm to 4 mm. In some embodiments, the step flap 226 has a thickness of 1 mm to 3.5 mm. In some embodiments, the step flap 226 has a thickness of 1 mm to 3 mm. In some embodiments, the step flap 226 has a thickness of 1 mm to 2.5 mm. In some embodiments, the step flap 226 has a thickness of 1 mm to 2 mm. In some embodiments, the step flap 226 has a thickness of 1 mm to 1.5 mm.

In some embodiments, the step flap 226 has a thickness of 1.5 mm to 5 mm. In some embodiments, the step flap 226 has a thickness of 1.5 mm to 4.5 mm. In some embodiments, the step flap 226 has a thickness of 1.5 mm to 4 mm. In some embodiments, the step flap 226 has a thickness of 1.5 mm to 3.5 mm. In some embodiments, the step flap 226 has a thickness of 1.5 mm to 3 mm. In some embodiments, the step flap 226 has a thickness of 1.5 mm to 2.5 mm. In some embodiments, the step flap 226 has a thickness of 1.5 mm to 2 mm.

In some embodiments, the step flap 226 has a thickness of 2 mm to 5 mm. In some embodiments, the step flap 226 has a thickness of 2 mm to 4.5 mm. In some embodiments, the step flap 226 has a thickness of 2 mm to 4 mm. In some embodiments, the step flap 226 has a thickness of 2 mm to 3.5 mm. In some embodiments, the step flap 226 has a thickness of 2 mm to 3 mm. In some embodiments, the step flap 226 has a thickness of 2 mm to 2.5 mm.

In some embodiments, the step flap 226 has a thickness of 2.5 mm to 5 mm. In some embodiments, the step flap 226 has a thickness of 2.5 mm to 4.5 mm. In some embodiments, the step flap 226 has a thickness of 2.5 mm to 4 mm. In some embodiments, the step flap 226 has a thickness of 2.5 mm to 3.5 mm. In some embodiments, the step flap 226 has a thickness of 2.5 mm to 3 mm.

In some embodiments, the step flap 226 has a thickness of 3 mm to 5 mm. In some embodiments, the step flap 226 has a thickness of 3 mm to 4.5 mm. In some embodiments, the step flap 226 has a thickness of 3 mm to 4 mm. In some embodiments, the step flap 226 has a thickness of 3 mm to 3.5 mm. In some embodiments, the step flap 226 has a thickness of 3.5 mm to 5 mm. In some embodiments, the step flap 226 has a thickness of 3.5 mm to 4.5 mm. In some embodiments, the step flap 226 has a thickness of 3.5 mm to 4 mm. In some embodiments, the step flap 226 has a thickness of 4 mm to 5 mm. In some embodiments, the step flap 226 has a thickness of 4 mm to 4.5 mm. In some embodiments, the step flap 226 has a thickness of 4.5 mm to 5 mm.

In some embodiments, the step flap 226 has a thickness of 0.1 mm. In some embodiments, the step flap 226 has a thickness of 0.5 mm. In some embodiments, the step flap 226 has a thickness of 1 mm. In some embodiments, the step flap 226 has a thickness of 1.5 mm. In some embodiments, the step flap 226 has a thickness of 2 mm. In some embodiments, the step flap 226 has a thickness of 2.5 mm. In some embodiments, the step flap 226 has a thickness of 3 mm. In some embodiments, the step flap 226 has a thickness of 3.5 mm. In some embodiments, the step flap 226 has a thickness of 4 mm. In some embodiments, the step flap 226 has a thickness of 4.5 mm. In some embodiments, the step flap 226 has a thickness of 5 mm.

In some embodiments, the step flap 226 has a thickness of 10 mil to 200 mil. In some embodiments, the step flap 226 has a thickness of 10 mil to 150 mil. In some embodiments, the step flap 226 has a thickness of 10 mil to 100 mil. In some embodiments, the step flap 226 has a thickness of 10 mil to 50 mil. In some embodiments, the step flap 226 has a thickness of 10 mil to 25 mil. In some embodiments, the step flap 226 has a thickness of 25 mil to 200 mil. In some embodiments, the step flap 226 has a thickness of 25 mil to 150 mil. In some embodiments, the step flap 226 has a thickness of 25 mil to 100 mil. In some embodiments, the step flap 226 has a thickness of 25 mil to 50 mil. In some embodiments, the step flap 226 has a thickness of 50 mil to 200 mil. In some embodiments, the step flap 226 has a thickness of 50 mil to 150 mil. In some embodiments, the step flap 226 has a thickness of 50 mil to 100 mil. In some embodiments, the step flap 226 has a thickness of 100 mil to 200 mil. In some embodiments, the step flap 226 has a thickness of 100 mil to 150 mil. In some embodiments, the step flap 226 has a thickness of 150 mil to 200 mil. In some embodiments, the step flap 226 has a thickness of 10 mil. In some embodiments, the step flap 226 has a thickness of 25 mil. In some embodiments, the step flap 226 has a thickness of 50 mil. In some embodiments, the step flap 226 has a thickness of 100 mil. In some embodiments, the step flap 226 has a thickness of 150 mil. In some embodiments, the step flap 226 has a thickness of 200 mil.

In some embodiments, each of the step flaps 226 is installed on the roof deck 202 by an adhesive. In some embodiments, the adhesive is adhered directly to the roof deck. In some embodiments, the adhesive is adhered to the underlayment layer 204. In some embodiments, the underlayment layer 204 is adhered directly to the roof deck 202. In some embodiments, the adhesive is located on a rear surface of the step flap 226. In some embodiments, the adhesive includes at least one adhesive strip. In some embodiments, the adhesive includes a plurality of adhesive strips. In some embodiments, the plurality of adhesive strips is arranged intermittently. In some embodiments, the adhesive is located proximate to the first side 238, the second side 240, the first edge 242 and/or the second edge 244. In some embodiments, the adhesive is a peel and stick film sheet. In some embodiments, the peel and stick film sheet includes at least one sheet of film removably attached to the rear surface of the step flap 226. In some embodiments, the peel and stick film sheet is composed of EverGuard Freedom HW peel and stick membrane manufactured by GAF. In some embodiments, the adhesive includes polyvinyl butyrate, acrylic, silicone, or polycarbonate. In some embodiments, the adhesive includes pressure sensitive adhesives. In some embodiments, the adhesive is an adhesive sealant.

In some embodiments, the step flap 226 includes a wind-resistance that conforms to standards under ASTM D3161—Standard Test Method for Wind-Resistance of Asphalt Shingles (Fan-Induced Method) test standards. In some embodiments, the wind-resistance of the step flap 226 is characterized by a Class A rating in accordance with the standards of ASTM D3161 test standards. In some embodiments, the wind-resistance of the step flap 226 is characterized by a Class D rating in accordance with the standards of ASTM D3161 test standards. In some embodiments, the wind-resistance of the step flap 226 is characterized by a Class F rating in accordance with the standards of ASTM D3161 test standards.

Example

Test specimens of the step flaps were composed of a 25 mil thick, single cap layer of TPO. Upper edges of the step flaps were positioned 2 inches offset from upper edges of the photovoltaic modules and subject to test velocities of 110 miles per hour winds for two hours in accordance with ASTM D3161. The specimens were observed for an damage, including disengagement from the roof deck. The step flap specimens did not exhibit any disengagement.

In some embodiments, a composition shingle 227 overlays the active portion 312 of the jumper module 310. In some embodiments, another one of the jumper module 310 overlays the jumper module 310 of the first subarray, as shown in FIG. 9. In some embodiments, the composition shingle 227 conceals the jumper modules 310. In some embodiments, the composition shingle 227 is a watershedding layer. In some embodiments, the composition shingle 227 is an asphalt shingle. In some embodiments, the composition shingle 227 is located at least 36 inches away from the roof ridge.

In some embodiments, the second side lap 117 of at least one of the photovoltaic modules 110 of the subarray S2 overlaps a roofing shingle. In some embodiments, the roofing shingle is an asphalt shingle. In some embodiments, one or more roofing shingle overlays the second side laps 117 of the photovoltaic modules 110 of the subarray S2. In some embodiments, the roofing shingle is an asphalt shingle.

In some embodiments, the photovoltaic system 200 includes a first flashing base 228. In some embodiments, the first flashing base 228 includes a flat base portion 231 having a first surface and a second surface opposite the first surface, an aperture 233 extending from the first surface to the second surface, and a sidewall 235 extending from the first surface to the second surface and surrounding the aperture 233. In some embodiments, the base portion 231 is rectangular in shape. In some embodiments, the base portion 231 is square in shape. In some embodiments, the base portion 231 is trapezoidal in shape. In some embodiments, the base portion 231 is circular in shape.

Figure 14:
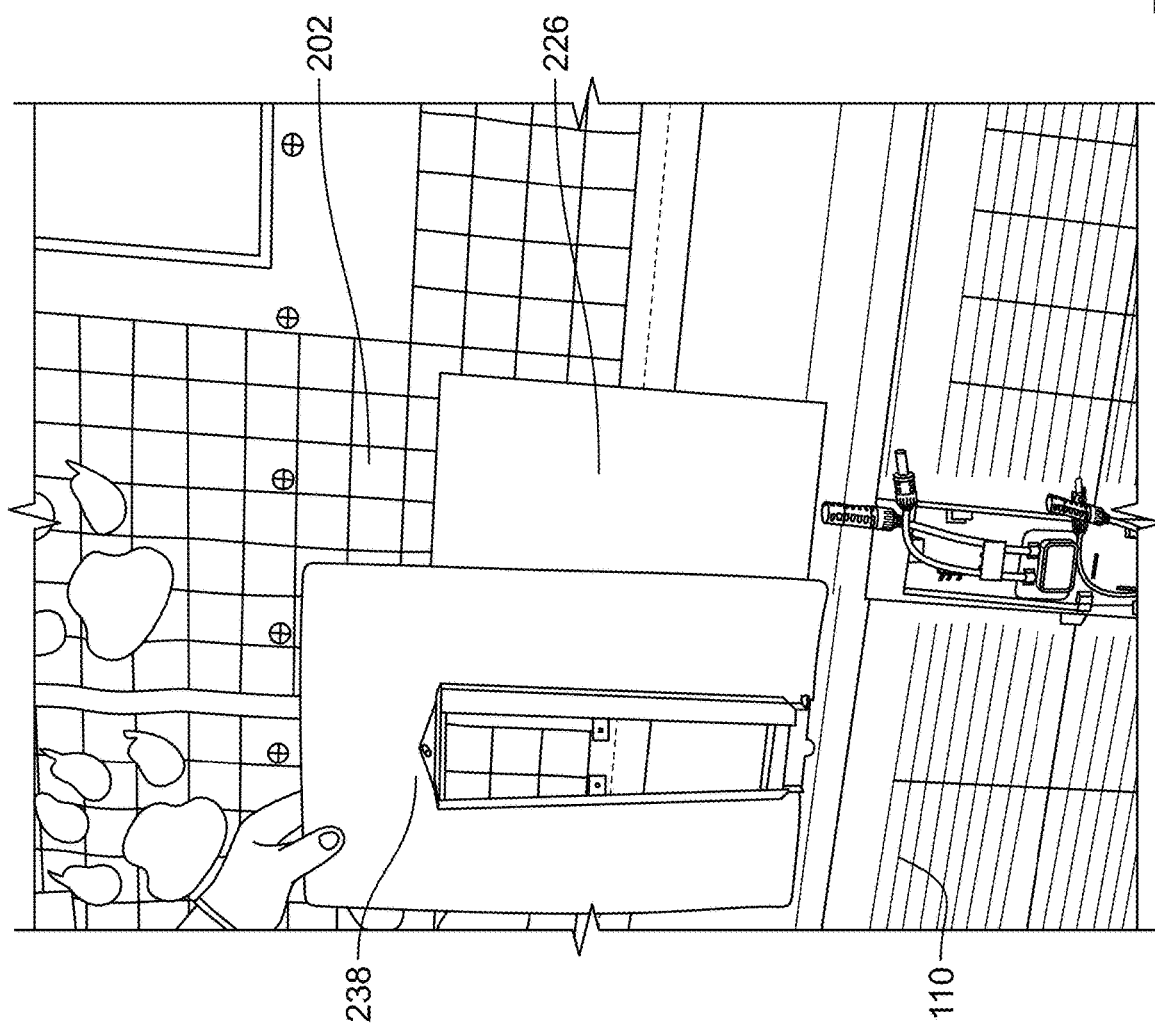
FIG. 14 is an illustration of embodiments of a photovoltaic system incorporating a step flap with a flashing base employed by the photovoltaic system.

In some embodiments, the first flashing base 228 is configured to be installed on the roof deck 202. In some embodiments, the first flashing base 228 is installed at the top of the wireway 222 of the subarray S1. In some embodiments, the sidewall 235 and the aperture 233 of the first flashing base 228 are aligned with the wire cover bracket 300 of the photovoltaic module 110 in the uppermost row R of the subarray S1. In some embodiments, a first flashing base 228 overlays the first side lap 330 of the jumper module 310. In some embodiments, the first flashing base is 228 is configured to be installed to the roof deck 202 by at least one fastener. In some embodiments, the base portion 231 is configured to receive the at least one fastener. In some embodiments, the at least one fastener includes a plurality of fasteners. In some embodiments, the plurality of fasteners is roofing nails. In some embodiments, the first flashing base is 228 is configured to be installed to the roof deck by an adhesive. In some embodiments, with reference to FIG. 14, the first flashing base 228 overlays at least one of another set of the step flaps 226.

In some embodiments, the photovoltaic system 200 includes a second flashing base 230. In some embodiments, the second flashing base 230 has a structure and function similar to those of the first flashing base 228, with certain differences. In some embodiments, the second flashing base 230 overlays the second side lap 332 of the jumper module 310. In some embodiments, the second flashing base 230 is installed on the roof deck and is aligned with the wireway 222 of the second subarray S2 in a manner similar to that of the first flashing base 228.

In some embodiments, one of the composition shingles 227 overlays the base portion 231 of the first flashing base 228 on at least one side of the sidewall 235 thereof. In some embodiments, each of a plurality of the composition shingles 227 overlays the base portion 231 of the first flashing base 228 on opposite sides of the sidewall 235. In some embodiments, one of the composition shingles 227 overlays the base portion 231 of the second flashing base 230 on at least one side of the sidewall 235 thereof. In some embodiments, each of a plurality of the composition shingles 227 overlays the base portion 231 of the second flashing base 230 on opposite sides of the sidewall 235. In some embodiments, asphalt roofing shingles are utilized instead of the composition shingles 227. In some embodiments, a transition box 232 with a cover 234 is installed on the first flashing base 228.

Referring to FIG. 10, in some embodiments, the photovoltaic system 200 is installed on the roof deck 202. In some embodiments, the photovoltaic system 200 is installed on a slope of the roof deck 202. In some embodiments, an additional, non-active (i.e., "dummy") wireway 280 and associated cover 304, similar to the at least one wireway 222 and the associated covers 304, may be installed on the end of the second subarray S2 for symmetry and aesthetics. In some embodiments, the non-active wireway 280 is installed over the second side laps 117 of the photovoltaic modules 110b. In some embodiments, the non-active wireway 280 does not include any electrical components or electrical wiring. In some embodiments, the non-active wireway 280 is optional and need not be included. In some embodiments, roofing shingles overlay the second side laps 117 of the photovoltaic modules 110b of the second subarray S2. In some embodiments, it should be understood that the non-active wireway 280 or roofing shingles may overlay the second side laps 117 of the photovoltaic modules 110a of the first subarray S1 in the absence of the second subarray S2.

It should be understood that the embodiments described herein are merely exemplary and that a person skilled in the art may make many variations and modifications without departing from the spirit and scope of the invention. All such variations and modifications are intended to be included within the scope of the invention.

What is claimed is:

1. A system, comprising:
   a roof deck;
   at least first, second, third, and fourth roofing shingles installed on the roof deck,
      wherein the first roofing shingle is a first asphalt roofing shingle,
      wherein the second roofing shingle is a second asphalt roofing shingle,
      wherein the third roofing shingle is a first photovoltaic module,
      wherein the fourth roofing shingle is a second photovoltaic module, and
      wherein each of the first and second asphalt roofing shingles includes
         an upper surface,
         a lower surface opposite the upper surface,
         a first end,
         a second end opposite the first end,
         a first edge extending from the first end to the second end, and
         a second edge opposite the first edge and extending from the first end to the second end,
      wherein each of the first and second photovoltaic modules includes a first layer and a reveal portion above the first layer,
         wherein the first layer includes:
            a first end,
            a second end opposite the first end of the first layer, and
            a side lap at the second end of the first layer,
            wherein the first layer is continuous from the first end of the first layer to the second end of the first layer,
         wherein the reveal portion includes a plurality of solar cells,
         wherein the reveal portion includes a first end and a second end opposite the first end of the reveal portion,
         wherein the second end of the reveal portion is between the first end of the first layer and the second end of the first layer,
         wherein the side lap is adjacent to the second end of the reveal portion and extends from the second end of the reveal portion to the second end of the first layer; and
   at least one step flap having
      a first side,
      a second side opposite the first side,
      a first edge extending from the first side to the second side,
      a second edge opposite the first edge of the at least one step flap and extending from the first side to the second side, and
      an upper surface,
         wherein the upper surface of the at least one step flap extends from the first side to the second side and from the first edge of the at least one step flap to the second edge of the at least one step flap,
         wherein the upper surface of the at least one step flap is flat, wherein the second end of the first asphalt roofing shingle overlays the first side of the at least one step flap on the upper surface of the at least one step flap,
         wherein the lower surface of the first asphalt roofing shingle is juxtaposed with the upper surface of the at least one step flap,
         wherein the first end of the first photovoltaic module overlays the second side of the at least one step flap on the upper surface of the at least one step flap,
         wherein the lower surface of the first photovoltaic module is juxtaposed with the upper surface of the at least one step flap, and
         wherein the second end of the first asphalt roofing shingle is adjacent to the first end of the first photovoltaic module, and
      wherein the first end of the second asphalt roofing shingle overlays an entirety of the side lap of the second photovoltaic module at the second end of the first layer of the second photovoltaic module to form an overlap portion, wherein the overlap portion comprises the lower surface of the second asphalt roofing shingle overlaying an uppermost surface of the side lap of the first layer of the second photovoltaic module, and wherein the overlap portion is adjacent the reveal portion of the second photovoltaic module.

2. The system of claim 1, wherein the first edge of the at least one step flap is vertically offset from the first edge of the second asphalt roofing shingle by 1 inch to 5 inches.

3. The system of claim 1, wherein the at least one step flap is composed of a polymer.

4. The system of claim 3, wherein the at least one step flap includes thermoplastic polyolefin (TPO).

5. The system of claim 1, wherein the at least one step flap has a thickness of 0.1 mm to 5 mm.

6. The system of claim 1, wherein the at least one step flap includes a first timing mark extending from the first edge to the second edge and between the first side and the second side, wherein the first timing mark extends substantially midway between the first edge and the second edge, and wherein the at least one step flap includes a second timing mark extending from the first side to the second side and between the first edge and the second edge, and wherein the second timing mark extends substantially midway between the first side and the second side.

7. The system of claim 1, wherein the upper surface of the at least one step flap includes an adhesive.

8. The system of claim 7, wherein the upper surface of the at least one step flap includes at least one release line that extends from the first edge of the at least one step flap to the second edge of the at least one step flap and between the first side and the second side.

9. The system of claim 8, further comprising a film removably attached to the upper surface of the at least one step flap.

10. The system of claim 1, wherein no step flap is below the second end of the second photovoltaic module.

11. A method, comprising:
  obtaining at least first, second, third, and fourth roofing shingles,
    wherein the first roofing shingle is a first asphalt roofing shingle,
    wherein the second roofing shingle is a second asphalt roofing shingle,
    wherein the third roofing shingle is a first photovoltaic module,
    wherein the fourth roofing shingle is a second photovoltaic module, and
    wherein each of the first and second asphalt roofing shingles includes
      an upper surface,
      a lower surface opposite the upper surface,
      a first end,
      a second end opposite the first end,
      a first edge extending from the first end to the second end, and
      a second edge opposite the first edge and extending from the first end to the second end,
    wherein each of the first and second photovoltaic modules includes a first layer and a reveal portion above the first layer,
    wherein the first layer includes:
      a first end,
      a second end opposite the first end of the first layer, and
      a side lap at the second end of the first layer,
      wherein the first layer is continuous from the first end of the first layer to the second end of the first layer,
      wherein the reveal portion includes a plurality of solar cells,
      wherein the reveal portion includes a first end and a second end opposite the first end of the reveal portion,
      wherein the second end of the reveal portion is between the first end of the first layer and the second end of the first layer,
      wherein the side lap is adjacent to the second end of the reveal portion and extends from the second end of the reveal portion to the second end of the first layer;
  obtaining at least one step flap,
    wherein each of the at least one step flap includes
      a first side,
      a second side opposite the first side,
      a first edge extending from the first side to the second side,
      a second edge opposite the first edge of the at least one step flap and extending from the first side to the second side, and
      an upper surface,
        wherein the upper surface of the at least one step flap extends from the first side to the second side and from the first edge of the at least one step flap to the second edge of the at least one step flap,
        wherein the upper surface of the at least one step flap is flat;
  installing the at least one step flap on a roof deck;
  overlaying the first end of the first photovoltaic module over the second side of the at least one step flap,
    wherein the lower surface of the first photovoltaic module is juxtaposed with the upper surface of the at least one step flap; and
  overlaying the second end of the first asphalt roofing shingle over the first side of the at least one step flap,
    wherein the lower surface of the first asphalt roofing shingle is juxtaposed with the upper surface of the at least one step flap, and
    wherein the second end of the first asphalt roofing shingle is adjacent to the first end of the first photovoltaic module; and
  overlaying the first end of the second asphalt roofing shingle over an entirety of the side lap of the second photovoltaic module at the second end of the first layer of the second photovoltaic module to form an overlap portion,
    wherein the overlap portion comprises the lower surface of the second asphalt roofing shingle overlaying an uppermost surface of the side lap of the first layer of the second photovoltaic module,
    wherein the overlap portion is adjacent the reveal portion of the second photovoltaic module.

12. The method of claim 11, wherein the first edge of the at least one step flap is vertically offset from the first edge of the second asphalt roofing shingle by 1 inch to 5 inches.

13. The method of claim 11, wherein the at least one step flap includes thermoplastic polyolefin (TPO).

14. The method of claim 11, wherein no step flap is installed under the second end of the second photovoltaic module.

* * * * *